(12) United States Patent
Purchase et al.

(10) Patent No.: US 7,058,249 B2
(45) Date of Patent: Jun. 6, 2006

(54) WAVEPLATE AND OPTICAL CIRCUIT FORMED USING MESOGEN-CONTAINING POLYMER

(75) Inventors: Ken Purchase, Mountain View, CA (US); Martin McKenzie, Los Altos Hill, CA (US); Lili Huang, Santa Clara, CA (US); Stephen Z. D. Cheng, Hudson Village, OH (US); Frank W. Harris, Akron, OH (US); Jason J. Ge, Maplewood, MN (US); Dong Zhang, Akron, OH (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 10/897,507

(22) Filed: Jul. 23, 2004
(Under 37 CFR 1.47)

(65) Prior Publication Data
US 2005/0100265 A1 May 12, 2005

Related U.S. Application Data

(62) Division of application No. 10/269,147, filed on Oct. 11, 2002, now Pat. No. 6,870,978.

(60) Provisional application No. 60/329,979, filed on Oct. 16, 2001.

(51) Int. Cl.
*G02B 6/12* (2006.01)
(52) U.S. Cl. .......................... 385/14; 385/15; 385/141; 385/37
(58) Field of Classification Search .................. 385/14, 385/15, 27, 31, 37, 39, 49, 132, 141
See application file for complete search history.

(56) References Cited

U.S. PATENT DOCUMENTS

| 5,173,381 | A | * | 12/1992 | Natansohn et al. ........... 430/19 |
| 5,385,690 | A | * | 1/1995 | Finkelmann et al. .. 252/299.01 |
| 5,679,757 | A | * | 10/1997 | Wudl et al. ................... 528/86 |
| 6,068,792 | A | * | 5/2000 | Watabe .................. 252/299.01 |
| 6,630,076 | B1 | * | 10/2003 | Cherkaoui et al. ..... 252/299.01 |
| 2004/0038408 | A1 | * | 2/2004 | Abbott et al. .................. 436/4 |

FOREIGN PATENT DOCUMENTS

| EP | 0 454 590 B1 | 10/1991 |
| EP | 0 623 830 B1 | 11/1994 |
| EP | 0 645 413 A1 | 3/1995 |
| JP | 04-241304 | 8/1992 |
| JP | 06-14726 | 1/1994 |

(Continued)

OTHER PUBLICATIONS

Boedeker Plastics (2001). Ultem® PolyEtherlmide Specifications, Boedeker Plastics, Inc.:Shriner, TX two pages.

*Primary Examiner*—Kaveh Kianni
(74) *Attorney, Agent, or Firm*—Morrison & Foerster LLP

(57) ABSTRACT

Waveplate, planar lightwave circuit incorporating the waveplate, and method of making an optical device. The waveplate is formed of a mesogen-containing polymer film having a backbone and sidechains containing mesogen groups. The waveplate may be formed by producing a mesogen-containing polymer film having a nonzero birefringence of suitable dimensions for insertion into a planar lightwave circuit. The waveplate may be so inserted into an optical circuit of a planar lightwave circuit so that an optical signal traversing the waveplate is changed, for instance, to have two polarization states.

24 Claims, 12 Drawing Sheets

FOREIGN PATENT DOCUMENTS

| | | |
|---|---|---|
| JP | 07-092326 | 11/1994 |
| JP | 11-202131 | 7/1999 |
| WO | WO-94/08269 A1 | 4/1994 |
| WO | WO-94/20881 A1 | 9/1994 |
| WO | WO-02/054140 A2 | 7/2002 |
| WO | WO-03/034102 A2 | 4/2003 |

* cited by examiner 4,4'-Bis(4,4'-isopropylidene diphenoxy)-bis(phthalic anhydride)

2,2'-Bis(trifluromethyl)benzidine

Bis{6-{4-biphenyloxy}hexyl}
4,4'-diamino-2,2'-biphenyldicarboxylate 4,4'-(Hexafluroisopropylidene)diphthalic anhydride The copolymer Terephthalic chloride Terephthalic acid Diphenic acid Polyamide

WAVEPLATE AND OPTICAL CIRCUIT FORMED USING MESOGEN-CONTAINING POLYMER This application is a divisional of U.S. Ser. No. 10/269, 147, filed Oct. 11, 2002 now U.S. Pat. No. 6,870,978, which claims the benefit of U.S. Provisional Application Ser. No. 60/329,979, filed Oct. 16, 2001, the contents of which are hereby incorporated by reference into the present disclosure for all purposes as if fully put forth herein.

BACKGROUND OF THE INVENTION

Planar lightwave circuits (PLCs) in telecommunications, such as arrayed waveguide gratings (AWGs) used to multiplex or demultiplex multiple optical signals transmitted over a single optical fiber, typically are formed of birefringent materials such as doped $SiO_2$ or $LiNbO_3$. Birefringence in planar waveguides complicates the design and operation of PLCs. Planar waveguides as are found in AWGs typically have different propagation constants for TE (transverse electric) and TM (transverse magnetic) waveguide modes caused by stress-induced birefringence introduced into the waveguides due to mismatched coefficients of thermal expansion of the substrate, core, and cladding. For AWGs, this difference in propagation constants produces a wavelength shift between each AWG channel's peak response to the TE input polarization and that channel's response to the TM polarization. The difference between the wavelength of peak TE transmission and the wavelength of peak TM transmission is called a polarization dependent wavelength shift (PDW). Even a small PDW may be a concern because of the problems it may cause, such as poor channel isolation as well as increased polarization-dependent loss (PDL).

One way to compensate for birefringence is to formulate a waveplate of a rigid polyimide polymer having a heat resistance of 300° C. or higher, as disclosed in U.S. Pat. No. 6,115,514. The waveplate changes the polarization state of light passing through the waveplate. The patent expresses a clear preference that the waveplate is formed of a rigid polymer with no more than 2 rotatable chemical bonds. The interchain orientation and intermolecular interactions of the polymer backbones creates birefringence and thermal stability as a sheet of the polymer is uniaxially drawn or stretched. Further, the patent states that it is necessary for the polymer to have a heat resistance in excess of 300° C.

Another way to compensate for birefringence is to use a birefringent crystal waveplate. Reported in 1992, a quartz waveplate was used to correct for polarization dependence in an arrayed-waveguide grating (AWG) multiplexer, although the method had high loss. More recently, a thin (10 μm thick) LiNbO3 half waveplate created using crystal ion slicing was demonstrated that could substantially reduce loss. In this paper, concerns are expressed about the hygroscopic nature of polyimides and possible long-term changes due to environmental factors. In addition, the LiNbO3 work stated the desire to improve polarization mode conversion ratios and the desire to create thinner waveplates for insertion loss reduction.

BRIEF SUMMARY OF THE INVENTION

The invention provides a polymeric waveplate and a planar lightwave circuit (PLC) containing the polymeric waveplate that corrects for or introduces a desired amount of birefringence into the PLC, creating a desired effect on the polarization state of an optical signal passing through the waveplate. The polymeric waveplate is formed of a polymer that has a mesogen in a side-chain of the polymer. The sidechain has an optional linker that attaches the sidechain to the polymer backbone and an optional spacer between the linker and the mesogen. The waveplate is formed by creating a thin film of the polymer and then uniaxially drawing (stretching) it at an elevated temperature to create the required degree of birefringence for the waveplate.

Birefringence in polymers can be created by inducing directional stress/strain in a film. When this directional stress/strain is applied to a polymer film, interchain orientation can result. The degree of orientation per unit stress/strain, and thus the magnitude of the induced birefringence, differs for polymers of differing compositions. The rate at which this orientation develops is increased when the polymer film is above its glass transition temperature. As the temperature of the film becomes lower than the glass transition temperature, some degree of orientation, and thus some level of increased birefringence, can be maintained. The degree of orientation that is maintained is influenced by the ability of the material to develop intermolecular, interchain interactions above Tg which persists as the temperature of the material falls below the glass transition.

One way to achieve such interactions is through strong interactions between polymer backbones. Polyimides are a class of materials that exhibits a degree of intermolecular, interchain interaction, which results in superior mechanical and high temperature properties. This high degree of interaction also results in birefringence in stressed polyimide films. In general, the higher the degree of rigidity of the polyimide backbone, the higher the degree of interchain interaction and the lower the achievable elongation upon drawing. In fact, crystallinity has been observed in the most rigid materials. Species such as flexible groups in the backbone and flexible sidechains ordinarily disrupt the degree of organization that the material can achieve. The presence of these moieties is thus ordinarily deleterious to the degree of birefringence that can be developed. These observations have been reported in the '514 patent, which expresses a strong preference for materials that contain no more than two (2) rotatable (swivel) bonds and thus a minimum degree of flexibility in the backbone. Ordinarily, high-rigidity polyimides such as those in the '514 patent exhibit high modulus and high glass-transition temperature Tg, and are not readily drawable to a significant degree. Stress must therefore be developed in a precursor polyamic acid film by drawing or by constraining the film and relying on shrinkage stress or anisotropic substrate expansion to provide and/or maintain orientation. The more flexible polymer precursor may then be further reacted, possibly under constraint, to preserve orientation.

It appears that one of the problems associated with waveplates formed of a high-rigidity polyimide is that the waveplate may be slightly warped rather than completely flat due to stresses introduced when forming the polymer into a waveplate. A waveplate formed of a high-rigidity polyimide can be warped to an extent that a surface of the waveplate stands as much as 1 mm off of a flat, horizontal surface upon which the waveplate is laid, despite the waveplate being only approximately 25 μm thick.

The polymers of this invention contain mesogenic side chains and are often composed of a more flexible backbone than the '514 patent teaches are possible if one desires to produce waveplate, and in particular, half waveplate articles. Further, the polymers of this invention can be drawn at significantly lower processing temperatures due to the flexibility of the backbone and the presence of the sidechains.

Although the flexibility of the backbone and presence of side chains reduce interchain interactions from the polymer backbone itself, the mesogens associate with one another to provide the necessary additional degree of interaction that maintains the order created by the stretching process and enable high birefringence to be attained. Thus the birefringence achieved during stress/strain above Tg provides a film that is suitable for use as a waveplate article after cooling and release from a stretching apparatus. This is achievable in spite of the presence of more flexible bonds than the '514 patent suggests are possible and in spite of the presence of side chains that would ordinarily be regarded as deleterious to the development of interchain interactions and thus to the development of sufficient birefringence for the production of thin waveplate articles. The temperature stability of the waveplates produced using exemplary mesogenic polymers of this invention is suitable for use up to 145C and reliable performance has been observed after repeated use at elevated temperature.

The incorporation of mesogenic structures as sidechains is a general concept that can, in principle, be applied to a variety of backbone structures and releases the technology from a reliance on "rigid" backbone materials as defined in the '514 patent. They can be used to create high-birefringence films from highly drawable, flexible backbones that are less prone to crystallinity and would otherwise be unlikely to be capable of high birefringence. Although the mesogen itself may in many embodiments of the invention not appreciably contribute directly to the birefringence, its main purpose in these embodiments is to simultaneously aid in the ability to draw (stretch) the polymer at temperatures well below 300° C. and raise the stability of the stretched structure through intermolecular interactions. The ability to strain the material over a wider range allows the production of birefringent articles of varying and potentially continuous waveplate performance. In addition, the mesogens help to provide low water sensitivity to the polymer when appropriately chosen.

The polymer may be uniaxially or biaxially drawn, and is preferably uniaxially drawn to create the birefringence necessary for a waveplate. An exemplary 15 μm thick half waveplate for operation at 1550 nm wavelength requires a birefringence of 0.52. The polymer of the invention can be cast into a thin film of appropriate thickness greater than 15 μm, and drawn to achieve the desired 15 μm thickness and 0.052 birefringence. Alternatively, the thickness of the cast film can be chosen such that the film can be drawn to a higher level of birefringence to facilitate a half waveplate as thin as 8 μm for the same application.

When forming a waveplate, the drawability, or ease with which the polymer can be drawn, is advantageously good, as evidenced by the large extent to which the polymer may be drawn. For instance, the polymer may be uniaxially drawn with elongation (localized change in length divided by original length) in excess of 50%, and is often drawn with elongation on the order of 100%–200%.

A waveplate of the invention preferably has a warpage of less than about 350 μm, more preferably less than about 250 μm warpage, and more preferably still less than about 150 μm warpage. Warpage is measured by placing the waveplate on a flat, horizontal surface and measuring the distance from that surface to the highest point on the resting waveplate.

What is disclosed by way of example and not by way of limitation is:

A waveplate comprising a mesogen-containing polymer film having a backbone and having sidechains containing mesogen groups, wherein the mesogen-containing polymer film has a length, a width, and a thickness such that said mesogen-containing polymer film is insertable into a channel in an optical pathway of the planar lightwave circuit.

A waveplate according to paragraph [0014] wherein said mesogen-containing polymer film has a birefringence sufficiently high to rotate or convert a polarization state of an optical signal traversing the optical pathway.

A waveplate according to paragraph [0015] wherein the birefringence is at least 0.52.

A waveplate according to paragraph [0015] wherein the waveplate is a half waveplate of thickness between 5 and 25 μm.

A waveplate according to paragraph [0015] wherein the waveplate is a quarter waveplate of thickness between 5 and 25 μm.

A waveplate according to paragraph [0014] wherein the mesogen-containing polymer film is formed of a polymer having a glass transition temperature between 100C and 300C.

A waveplate according to paragraph [0014] wherein the backbone contains monomers having at least two groups that provide rotational freedom within the backbone.

A waveplate according to paragraph [0014] wherein the waveplate has a warpage of less than 350 μm.

A waveplate according to paragraph [0014] wherein the backbone comprises a polymer selected from the group consisting of: polyimides, polyetherimides, polyesterimides, polyamideimides, polyketones, polyarylethers, polyetherketones, polysulfones, polysulfides, polyarylenes, polyesters, polyamides, polycarbonates, polyolefins, polyvinylesters, polyurethanes, polyacrylates, polyphenylenes.

A waveplate according to paragraph [0022] wherein the backbone comprises polyetherimide polymer.

A waveplate according to paragraph [0022] wherein the backbone comprises polyamide polymer.

A waveplate according to paragraph [0023] wherein the backbone is formed of one or more components selected from the group consisting of 4,4'-bis(4,4'-isopropylidene diphenoxy)-bis(phthalic anhydride); 4,4'-(hexafluoroisopropylidene)diphthalic anhydride; 2,2 '-bis(trifluoromethyl) benzidine; and bis {6-[4-biphenyloxy]hexyl}4,4'diamino-2-2'-biphenyldicarboxylate.

A waveplate according to paragraph [0024] wherein the backbone is formed of one or more components selected from the group consisting of isophthalic chloride; 2,2'-bis (trifluoromethyl)benzidine; bis{6-[4-biphenyloxy]hexyl}4, 4'diamino-2-2'-diphenyldicarboxylte; and 4,4'-bis(4,4'-isopropylidene diphenoxy)-bis(phthalic anhydride).

A waveplate according to paragraph [0026] wherein the backbone is formed of isophthalic chloride; 2,2'-bis(trifluoromethyl)benzidine; and bis{6-[4-biphenyloxy]hexyl}4, 4'diamino-2-2'-biphenyldicarboxylate.

A waveplate according to paragraph [0026] wherein the backbone is formed of 2,2'-bis(trifluoromethyl)benzidine; bis{6-[4-biphenyloxy]hexyl}4,4'diamino-2-2'-diphenyldicarboxylate; and 4,4'-bis(4,4'-isopropylidene diphenoxy)-bis(phthalic anhydride).

A waveplate according to paragraph [0014] wherein the mesogen groups have the form phenyl-X-phenyl-R or phenyl-phenyl-R, where X is selected from the group consisting of azo, diazo, azoxy, nitrone, carbon-carbon double bond, carbon-carbon triple bond, amide, imide, Schiff base, and ester; and R is selected from the group consisting of poly (alkylene oxide), polyalkane, polyperfluoroalkane, polysiloxane, and aliphatic polyether.

A waveplate according to paragraph [0014] wherein the mesogen groups are selected from the group consisting of trans 1,3 cyclohexane; trans 1,4 cyclohexane; trans 2,5 disubstituted 1,3 dioxane; trans 2,5 disubstituted 1,3 dithiane; and trans 2,5 disubstituted 1,3 dioxathiane.

A waveplate according to paragraph [0022] wherein the mesogen groups have the form phenyl-X-phenyl-R or phenyl-phenyl-R, where X is selected from the group consisting of azo, diazo, azoxy, nitrone, carbon-carbon double bond, carbon-carbon triple bond, amide, imide, Schiff base, and ester; and R is selected from the group consisting of poly (alkylene oxide), polyalkane, polyperfluoroalkane, polysiloxane, and aliphatic polyether.

A waveplate according to paragraph [0022] wherein the mesogen groups are selected from the group consisting of trans 1,3 cyclohexane; trans 1,4 cyclohexane; trans 2,5 disubstituted 1,3 dioxane; trans 2,5 disubstituted 1,3 dithiane; and trans 2,5 disubstituted 1,3 dioxathiane.

A waveplate according to paragraph [0014], [0022], [0023], or [0024] wherein the mesogen group is biphenyl.

A waveplate according to paragraph [0014] wherein the mesogen groups comprise at least two aromatic groups and wherein the mesogen groups associate to help maintain birefringence as the film is drawn.

A waveplate according to paragraph [0014] wherein the side chains comprise linking groups linking the mesogen groups to the backbone, wherein the linking groups are selected from the group consisting of: ether, ester, amide, imide, urethane, alkylene, alkyl.

A waveplate according to paragraph [0022] wherein the side chains comprise linking groups linking the mesogen groups to the backbone, wherein the linking groups are selected from the group consisting of ether, ester, amide, imide, urethane, alkylene, alkyl.

A waveplate according to paragraph [0029] wherein the side chains comprise linking groups linking the mesogen groups to the backbone, wherein the linking groups are selected from the group consisting of ether, ester, amide, imide, urethane, alkylene, alkyl.

A waveplate according to paragraph [0030] wherein the side chains comprise linking groups linking the mesogen groups to the backbone, wherein the linking groups are selected from the group consisting of ether, ester, amide, imide, urethane, alkylene, alkyl.

A waveplate according to any of paragraphs [0014], [0022], [0029], [0030], and [0034]–[0038] wherein the side chains further comprise spacing groups linking the mesogen groups to the linking groups, the spacing groups being selected from the group consisting of poly(alkylene oxide), polyalkane, polyperfluoroalkane, polysiloxane, and aliphatic polyether.

A waveplate according to paragraph [0014] wherein the spacing groups are sufficiently long and sufficiently flexible to allow the mesogens of adjacent sidechains to associate as a film of the mesogen-containing polymer is stretched.

A planar lightwave circuit comprising a waveguide and a waveplate according to any of paragraphs [0014]–[0040] positioned in an optical pathway of the waveguide.

A planar lightwave circuit according to paragraph [0041] wherein the waveplate is a half waveplate.

A planar lightwave circuit according to paragraph [0041] wherein the waveplate is a quarter waveplate.

A planar lightwave circuit according to paragraph [0041] wherein the waveplate resides in a channel cut or etched through the waveguide.

A planar lightwave circuit according to paragraph [0041] wherein the waveguide is one of a plurality of waveguides of an arrayed waveguide grating positioned between two free propagation regions of the planar lightwave circuit, and wherein the waveplate is positioned in an optical pathway of each of the plurality of waveguides of the arrayed waveguide grating.

A planar lightwave circuit according to paragraph [0041] wherein the waveplate is positioned at an angle to the waveguides that reduces back reflection caused by the waveplate groove, glue, and waveplate.

A method of making an optical device comprising
(a) providing a mesogen-containing polymer film; and
(b) forming the mesogen-containing polymer piece to have a length, a width, and a thickness adapted for use in a planar lightwave circuit, the mesogen-containing polymer piece having a birefringence not equal to zero, said birefringence being suitable for use in a waveguide of a planar lightwave circuit A method according to paragraph [0047] and further comprising inserting the polymer piece into an optical pathway of a waveguide of the planar lightwave circuit.

A method according to paragraph [0047] wherein the mesogen-containing polymer film has a polymer backbone selected from the group consisting of polyimides, polyetherimides, polyesterimides, polyamideimides, polyketones, polyarylethers, polyetherketones, polysulfones, polysulfides, polyarylenes, polyesters, polyamides, polycarbonates, polyolefins, polyvinylesters, polyurethanes, polyacrylates, polyphenylenes.

A method according to paragraph [0047] wherein the mesogen-containing polymer film contains at least one mesogen having the form phenyl-X-phenyl-R or phenyl-phenyl-R, where X is selected from the group consisting of azo, diazo, azoxy, nitrone, carbon-carbon double bond, carbon-carbon triple bond, amide, imide, Schiff base, and ester; and R is selected from the group consisting of poly (alkylene oxide), polyalkane, polyperfluoroalkane, polysiloxane, and aliphatic polyether.

A method according to paragraph [0047] wherein the mesogen groups are selected from the group consisting of trans 1,3 cyclohexane; trans 1,4 cyclohexane; trans 2,5 disubstituted 1,3 dioxane; trans 2,5 disubstituted 1,3 dithiane; and trans 2,5 disubstituted 1,3 dioxathiane.

A method according to paragraph [0051] wherein the mesogen-containing polymer film contains at least one mesogen having the form phenyl-X-phenyl-R or phenyl-phenyl-R, where X is selected from the group consisting of azo, diazo, azoxy, nitrone, carbon-carbon double bond, carbon-carbon triple bond, amide, imide, Schiff base, and ester; and R is selected from the group consisting of poly (alkylene oxide), polyalkane, polyperfluoroalkane, polysiloxane, and aliphatic polyether.

A method according to paragraph [0051] wherein the mesogen groups are selected from the group consisting of trans 1,3 cyclohexane; trans 1,4 cyclohexane; trans 2,5 disubstituted 1,3 dioxane; trans 2,5 disubstituted 1,3 dithiane; and trans 2,5 disubstituted 1,3 dioxathiane.

A method according to paragraph [0047] wherein the mesogen-containing polymer film has at least one linking group selected from the group consisting of ether, ester, amide, imide, urethane, alkylene, alkyl.

A method according to paragraph [0051] wherein the mesogen-containing polymer film has at least one linking group selected from the group consisting of ether, ester, amide, imide, urethane, alkylene, alkyl.

A method according to paragraph [0052]wherein the mesogen-containing polymer film has at least one linking group selected from the group consisting of ether, ester, amide, imide, urethane, alkylene, alkyl.

A method according to paragraph [0053] wherein the mesogen-containing polymer film has at least one linking group selected from the group consisting of ether, ester, amide, imide, urethane, alkylene, alkyl.

A method according to paragraph [0054] wherein the mesogen-containing polymer film has at least one linking group selected from the group consisting of ether, ester, amide, imide, urethane, alkylene, alkyl.

A method according to paragraph [0055] wherein the mesogen-containing polymer film has at least one linking group selected from the group consisting of ether, ester, amide, imide, urethane, alkylene, alkyl.

A method according to any of paragraphs [0047] and [0051]–[0061] wherein the mesogen-containing polymer film has at least one spacer group selected from the group consisting of poly(alkylene oxide), polyalkane, polyperfluoroalkane, polysiloxane, and aliphatic polyether.

A method of using a mesogen-containing polymer, said method comprising processing the mesogen-containing polymer into a film with birefringence in the plane of the film, inserting the mesogen-containing polymer film into an optical pathway of a waveguide of a planar lightwave circuit such that the polymer effects a change in an optical signal transmitted through the waveguide and the polymer.

A method of using a mesogen-containing polymer comprising passing an optical signal having a first polarization state through a waveguide and the polymer such that the optical signal has a second polarization state not identical to the first polarization state.

Among other factors, the invention is based in the technical finding that a preferred polymer formed of a flexible polymeric backbone having a mesogen attached to the backbone through a linker and a spacer can be drawn uniaxially to provide a thin preferred waveplate (typically less than 20 μm thick) that is flat and can be inserted into a planar lightwave circuit while the intermolecular interactions enhanced by the mesogens maintain sufficiently high birefringence in the stretching process to allow the waveplate to compensate for polarization effects created by birefringence elsewhere in the PLC. Such preferred polymer is drawn in a single step at temperatures well below 300° C., and can be drawn up to in excess of 150% to achieve high birefringence up to in excess of 0.1 with a high degree of repeatability and uniformity. The mesogen helps maintain the birefringence created in drawing as long as the waveplate is operated sufficiently below the Tg of the polymer. The mesogen of the preferred waveplate also acts much as an internal plasticizer acts, reducing the glass-transition temperature (Tg) so that the fully-reacted polymer can be reliably and repeatably drawn to form the waveplate without need for further reacting of the polymer (such as imidization) during or after drawing, and without need for appreciable solvent content in the film. These technical findings and advantages and others are apparent from the discussion herein.

DETAILED DESCRIPTION OF THE PREFERRED EMBODIMENT

A waveplate of the invention formed of a mesogen-containing polymer is useful in compensating for birefringence in a planar lightwave circuit (PLC). A PLC typically is formed of a birefringent material such as doped silicon oxide or lithium niobate, such that the transverse electric (TE) and transverse magnetic (TM) modes of the optical signal travel at different velocities through the material and arrive at a given part of the PLC or a detector integrated into the PLC out of phase. In many instances, a thin half waveplate inserted into the optical path of the PLC with its principle axis oriented at 45° to the plane of the PLC compensates for problems generated by birefringence in any part of the PLC. Thus, the TE and TM modes arrive at the desired part of the PLC within a period of time of each other that allows the PLC to function independently of input polarization without having to itself compensate for the birefringence.

In practical PLC devices made from practical PLC materials such as doped silicon oxide, polymers, silicon oxide and polymers, or lithium niobate, TE and TM modes of an optical signal can also experience differing loss of intensity through the components of a PLC device such as waveguides, couplers, star couplers, and waveguide gratings. This loss difference is called polarization dependent loss (PDL), and is preferably minimized, most preferably zero, although in practical PLC devices, the PDL can be unacceptably large. In many instances, a thin half waveplate inserted into the optical path of the PLC with its principle axis oriented at 45° to the plane of the PLC compensates for PDL by causing equivalent losses for light entering the waveguide in TE and TM modes.

Figure 5:
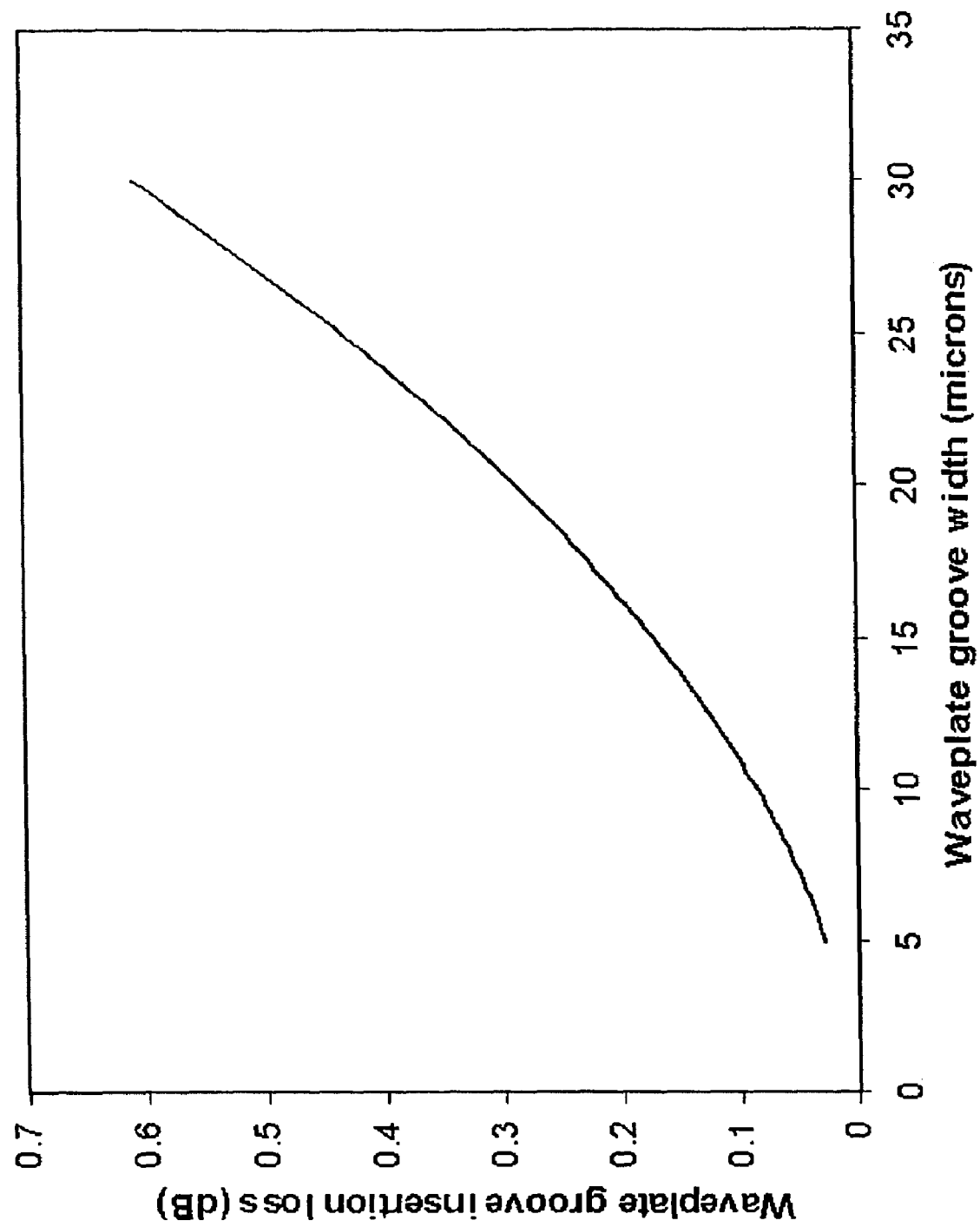
FIG. 5 is a graph of the calculated insertion loss due to a waveplate groove as a function of the groove width.

Cutting a groove in a PLC and inserting the waveplate in the PLC causes undesirable additional loss, termed insertion loss, of the light in the PLC. The loss occurs when light in a waveguide reaches the groove and waveplate, and rapidly spreads by diffraction. When it reaches the waveguide on the other side of the groove, not all the light can make it back into the single-mode waveguide. A groove made wider to accommodate a wider waveplate will have higher loss, thus a narrower groove (and thus narrower waveplate) are preferable. FIG. 5 shows the theoretical insertion loss caused by a waveplate groove as a function of the groove width. This additional insertion loss decreases with decreasing width of the groove into which the waveplate is inserted, which is typically 2–10 μm wider than the thickness of the waveplate. Thus it is desirable to have a waveplate of a minimal practical thickness to allow a groove of minimum practical thickness which in turn gives the minimum practical insertion loss. For this reason, the waveplate is typically made quite thin, being less than 30 μm, preferably less than about 20 μm, and more preferably less than 15 μm thick.

Further, as mentioned above, preferred waveplates of this invention have little warpage. A flat waveplate requires a thinner channel for insertion into a PLC than does a warped waveplate. Oftentimes it is extremely difficult to insert a warped waveplate, especially one made of a rigid polyimide, into a channel cut in a PLC to have about the same thickness as the waveplate polymer. It sometimes can be necessary to form a channel of greater width than would be formed for a flat waveplate to allow a warped waveplate to be inserted into the channel within a reasonable period of time. A flat waveplate as provided in certain embodiments of this invention can therefore aid in reducing insertion loss, since the channel in the PLC into which the waveplate is inserted can be formed only about 2–5 μm wider than the waveplate thickness.

Polymers typically have a much lower transmittance of optical power per unit thicknesss than waveguides made of inorganic materials such as $SiO_2$ or $LiNbO_3$ as found in many PLCs (especially those of the invention). Consequently, thin polymeric waveplates made using a mesogen-containing polymer often transmit more optical power than do thicker polymeric waveplates. Additionally, the use of mesogens allows more flexibility in selecting a polymer backbone with low optical absorption.

The most commonly used waveplates in PLC devices are quarter and half waveplates for use at the common optical communication wavelengths of 1300 nm and 1550 nm. Examples of waveplates that may be used with PLC devices include a 7.5 μm thick quarter waveplate at 1300 nm (requiring a birefringence of 0.043), a 7.5 μm thick quarter waveplate at 1550 nm (requiring a birefringence of 0.052), a 15 μm thick half waveplate at 1550 nm (requiring a birefringence of 0.052), and a 10 μm half waveplate at 1550 nm (requiring a birefringence of 0.078). A polymer for use in making waveplates therefore is preferably capable of reaching or exceeding a birefringence when drawn of 0.043, more preferably 0.052, and even more preferably 0.078.

A mesogen-containing polymer is made into a waveplate by drawing (stretching) and heating a thin film of the polymer that starts with little or no in-plane birefringence. The birefringence of the polymer film used to make the waveplate may be achieved by stretching either uniaxially and/or biaxially by any method known to one of ordinary skill. A mesogen-containing polymer often increases in birefringence as the polymer is drawn. The mesogens align and associate during the drawing process to maintain sufficient birefringence in the flexible film to rotate polarization or convert from one form of polarization to another (such as from linear to circular), for instance. An exemplary mesogen-containing polymer of this invention is presented later in which the maximum attained birefringence upon drawing is greater than 0.105. Such a polymer can be drawn less than this maximum amount to achieve the necessary birefringence of 0.052 to make a 15 μm half waveplate for use at 1550 nm wavelength, for example.

Most often a ½ waveplate or a ¼ waveplate is used. However any value between 0 and 1 or more waves is often obtainable with a mesogen-containing polymer. For example, the waveplate may differ from these established values by a small amount to allow the waveplate to be inserted into a PLC at an angle slightly different from perpendicular to the direction of light propagation such that the light in the waveguide experiences the desired effect.

The waveplate may be a transmissive waveplate, in which an optical signal exits a face opposite to the face of the waveplate that the signal entered. Alternatively, the waveplate may be a reflective waveplate, in which one face of the waveplate is coated with a reflective substance such as gold, sliver, aluminum, copper, palladium, nickel, or titanium by sputter-coating a stretched polymer film prior to forming the waveplate. The reflective coating reflects an optical signal back through the polymer film through which it traveled to reach the coating, allowing the polymer film to be only half as thick as would otherwise be needed to effect a desired change in an optical signal.

The polymer used to form the waveplate has a mesogen attached to a polymeric backbone by a linker and an optional spacer. This general configuration is also found in side chain polymer liquid crystals, and many polymers suitable to form side chain polymer liquid crystals can be used as the basis to form waveplates and PLCs of the invention by forming the polymer to have a suitable molecular weight and by reducing the number of mesogen groups present on a polymer molecule so that the polymer does not form large liquid crystal phases that would otherwise diffract or block light from passing through the polymer.

Each of the components of the polymer is discussed in turn.

Mesogen

As a film of mesogen-containing polymer is drawn, the mesogens associate to maintain the birefringence after the film is drawn. The mesogen may be any single or combination of mesogens used in making liquid crystal polymers. Thus, usually the mesogen is made up of a rigid core of one or multiple aromatic rings.

A mesogen as used in the waveplate or PLC of the invention may be a compound as depicted in Formula 1 and/or Formula 2:

-phenyl-phenyl-R                    Formula 1

-phenyl-X-phenyl-R                  Formula 2 where X is any rigid central linkage that keeps one phenyl group in a fixed spatial relationship with the other phenyl group to which it is attached, including azo, diazo, nitrone, azoxy, carbon-carbon double bond (to give stilbene), carbon-carbon triple bond (to give tolan), amide, imide, Schiff base, and ester; and R is a substituent such as hydrogen or a flexible spacer such as an alkyl, cycloalkyl, aryl, aralkyl, alkaryl, cyano, alkoxy, acyloxy, or halogen. Examples of these groups are listed in Table 1.

Preferred mesogens include:
phenyl-phenyl (R is hydrogen)
phenyl-phenyl-cyano
phenyl-phenyl-acyloxy
phenyl-phenyl-alkyl (length 1–18 carbons)
phenyl-phenyl-aryl
phenyl-C double bond C-phenyl (R is hydrogen)
phenyl-C double bond C-phenyl-cyano
phenyl-C double bond C-phenyl-acyloxy
phenyl-C double bond C-phenyl-alkyl (length 1–18 carbons)

phenyl-C double bond C-phenyl-aryl
phenyl-C triple bond C-phenyl (R is hydrogen)
phenyl-C triple bond C-phenyl-cyano
phenyl-C triple bond C-phenyl-acyloxy
phenyl-C triple bond C-phenyl-alkyl (length 1–18 carbons)
phenyl-C triple bond C-phenyl-aryl
phenyl-ester-phenyl (R is hydrogen)
phenyl-ester-phenyl-cyano
phenyl-ester-phenyl-acyloxy
phenyl-ester-phenyl-alkyl (length 1–18 carbons)
phenyl-ester-phenyl-aryl
phenyl-amide-phenyl (R is hydrogen)
phenyl-amide-phenyl-cyano
phenyl-amide-phenyl-acyloxy
phenyl-amide-phenyl-alkyl (length 1–18 carbons)
phenyl-amide-phenyl-aryl
phenyl-azo-phenyl (R is hydrogen)
phenyl-azo-phenyl-cyano
phenyl-azo-phenyl-acyloxy
phenyl-azo-phenyl-alkyl (length 1–18 carbons)
phenyl-azo-phenyl-aryl In addition to the forms specified by Formula 1 and Formula 2 above, mesogens may include other ring structures that associate with one another with an affinity similar to the structures above, such as trans 1,3 cyclohexane; trans 1,4 cyclohexane; trans 2,5 disubstituted 1,3 dioxane; trans 2,5 disubstituted 1,3 dithiane; and trans 2,5 disubstituted 1,3 dioxathiane.

In a liquid crystal polymer, the mesogens attached to the polymer backbone are found in one layer, and the polymer backbones localize in another layer characteristic of the smectic phase. This may in certain instances help to form a double-comb structure where side chains point away from the backbone in an alternating manner.

In a polymer of the invention, it is believed that no appreciable smectic phase is formed, although birefringence does increase as a polymer film is stretched. It is believed that some mesogens on polymer backbones may align with one another, but the extent to which such alignment occurs is either insufficient to form separate phases in the polymer or, if separate phases form, the extent to which the separate phases are present is not so great that the optical signal is scattered or lost to the extent that occurs in liquid crystal polymers. The mesogen is present in an amount sufficient to maintain a desired birefringence in the waveplate as the polymer is stretched to form a film of a thickness suitable to form the waveplate.

The polymer has a sufficient number of mesogen groups present in it to provide a birefringent film that can be formed into a waveplate by drawing at reasonable temperature as described herein. The polymer may have a single mesogen or multiple mesogens per repeating unit of the polymer, although generally the polymer has fewer than one mesogen per repeating unit on average. Generally, from about 5 to about 75% of the monomers (mole/mole) have a mesogen attached, preferably from about 10 to about 50% of the monomers have a mesogen attached to them. In an exemplary polymer of this invention, two mesogens are attached to one of every five repeat units of the backbone.

The mesogen-containing polymer may be a random polymer, in which case mesogen groups are distributed randomly along the polymer. Alternatively, the mesogen-containing polymer may be a block copolymer having mesogen groups deliberately clustered together in one or more segment(s) of the polymer chain.

Polymer Backbone

The polymeric backbone may be a linear polymer such as a polymer formed of one or more of the following monomers or repeating units: olefin, etherimide, ester, vinyl ester, urethane, amide, imide, amide imide, ester imide, acrylate, etherketone, aryl ether, carbonate, sulfone, and phenylene. The linear chains of the polymer backbone may slide past one another to some degree to allow the polymer to be stretched along one or more axes. The mesogens also promote slippage of polymer chains past one another, since the mesogens and their optional spacers help to separate polymer chains and may reduce substantial entanglements that would otherwise limit stretching. Backbone polymers may be chosen to provide the desired degree of thermal stability. Preferable backbone polymers include polyimides, polyetherimides, polyesterimides, polyamideimides, polyketones, polyarylethers, polyetherketones, polysulfones, aromatic polysulfides, polyarylenes, aromatic polyesters, aromatic polyamides, and aromatic polycarbonates.

Polymers used to form the waveplate preferably have at least two swivel bonds per repeat unit incorporated into the backbone that allow portions of the backbone to rotate relative to one another. The polymer can be made flexible and can be drawn to a large extent due at least in part to these groups. Such groups include single-bonded carbon, nitrogen, oxygen, sulfur, silicon, and other such groups well-known in the art.

One particularly preferred backbone polymer is a polyetherimide. A polyetherimide is a flexible polymer because the ether linkages allow the groups to which the ether linkage is attached to rotate or assume many different positions. It is believed that a polyetherimide has a degree of movement in the backbone that permits the mesogens to associate with one another to maintain birefringence, especially as a film of the polymer is stretched.

Optional Linker

An attachment group, or linker, is any group that permits the mesogen to be attached to the polymer backbone. A polymer formed of an acrylate or vinyl acetate attaches the mesogen to the hydrocarbon through the ester of the acrylate or acetate groups, respectively. In this instance, the ethylene unit of the vinyl acetate or acrylate will be part of the backbone. The mesogen may be attached directly to the linker, or the mesogen may be attached to a spacer that is itself attached to the linker. Suitable linkers include ester, ether, imide, amide, urethane and saturated or unsaturated aliphatic groups as described below for spacers. Preferred linkers include esters, ethers, amides and alkylenes.

Optional Spacer

The spacer is an optional group that allows the mesogens to move somewhat independently of the polymer backbone. The spacer and linker together have a length that allows the mesogen to associate with another mesogen attached to the same polymer backbone and/or to a different polymer backbone. Thus, mesogens may associate with one another despite polymer chain entanglement or lack of polymer backbone orientation along any one general direction, and the spacer in a polymer can also help to provide an additional degree of sidechain mobility and placement in conjunction with backbone movement aided by groups that do not sterically hinder portions of the backbone from moving relative to one another. Further, a longer spacer helps to reduce the glass transition temperature and aid in drawability of a polymer film.

Thus, it is beneficial to have a spacer that is sufficiently long and flexible to allow mesogens on the same and/or adjoining polymers to associate with one another, especially as a film of the polymer is drawn. It is also beneficial to have a spacer that is not so short and/or rigid that a substantial number of mesogens that have associated are drawn away from each other, substantially reducing or eliminating the effect of the mesogens on birefringence. The spacer should not be so long that its properties become significant and affect or even dominate the properties of the backbone.

Suitable spacers include saturated or unsaturated aliphatic groups, aliphatic polyethers, siloxanes, aliphatic polyesters, aliphatic polyamides, or other chain-like groups that space the mesogen away from the polymer backbone. Aliphatic spacers typically contain from one to twenty carbon atoms (e.g. methyl to didecyl), preferably from two to ten carbon atoms (e.g. ethyl to decyl), and more preferably from four to 10 carbon atoms (e.g. butyl to decyl). Preferred spacers include saturated aliphatic polyether chains having from 3 to 12 carbon atoms such as polyethylene or polypropylene oxides. Other spacers having about the same lengths as specified above are also preferred. Other preferred spacers include polyalkylenes having from 2 to 12 carbon atoms, polyperfluoroalkylenes having from 2 to 12 carbon atoms, and polysiloxanes having from 2 to 12 silicon atoms.

Further Discussion of the Polymer

The polymer is preferably amorphous or substantially amorphous so that an optical signal passes through the waveplate without a degree of attenuation or scattering that degrades the performance of the PLC optical device (such as substantially increasing optical loss) or causes problems in detecting the optical signal with detection equipment (such as optical sensors) positioned downstream of the polymer.

A waveplate or PLC in use may experience an elevated temperature for an extended period of time. Typically, these components are housed within enclosures that contain heat-generating electronic equipment, and often the components are located where cooled air cannot be provided to the components (such as in a pedestal in a residential or business district located in a desert). A PLC for telecommunications application is typically required to operate without failure in ambient environments with temperatures as high as 70° C. In some cases, such as most AWG's, the PLC is temperature stabilized at a temperature above this maximum ambient temperature to avoid unwanted temperature fluctuations. This stabilization temperature typically is at or below 85° C. Thus it is desirable that any waveplate used in a PLC can be subject to 85° C. temperature for the lifetime of the PLC without degradation in the optical performance of the waveplate. As the temperature of a polymer waveplate gets near (within about 10–20° C.) the glass transition temperature of the polymer, a process called relaxation occurs, in which the heat causes a transition from a glassy state to a more liquid state. This enables motion of the polymer chains and reduces or eliminates the orientation imparted by the strain/stresss, degrading its optical performance. As a rule of thumb, a polymer waveplate should be able to withstand temperatures about 40° C. below the polymer's glass transition temperature without degradation of optical properties, and higher glass transition temperatures will mean increased resistance to heat. Therefore, the glass transition temperature of the polymer is preferably at least about 125C, and more preferably at least about 150C. A glass transition temperature as specified helps to assure that the optical properties of the waveplate or PLC do not degrade substantially over a period of years by assuring that the polymer does not "melt" or have areas which undergo a phase transition that can allow polymer molecules to move relative to one another, potentially changing the birefringence.

The polymer used to make a waveplate or PLC of the invention is preferably selected to have a glass transition temperature of no more than about 300C, and preferably the glass transition temperature is no more than about 250C. Such polymer is easy to process into waveplates reliably and repeatably, without degrading the polymer itself. A polymer with a glass transition temperature of at least 300C is more difficult to stretch repeatably and controllably, especially where the polymer is undergoing a polymerization reaction such as imidization simultaneously with stretching. The preferred polymer used in waveplates and PLCs of the invention is completely reacted (e.g. imidized) prior to stretching, and since the glass transition temperature is less than 300C for this polymer, polymer stretching can be controlled easily, and birefringence is repeatable each time a film of material is stretched.

Mesogens and any associated spacers typically act as a plasticizer to reduce the glass transition temperature of the waveplate polymer and therefore decrease the temperature required for drawability of the polymer (especially when attached to the backbone through an optional linking group). Consequently, in many instances the backbone portion of the waveplate polymer may be formed of a polymer that has a high glass transition temperature and/or is more difficult to draw in the absence of mesogens, and the incorporation of mesogens into the polymer reduces the glass transition temperature to below the preferred maximum glass transition temperature and/or improves drawability.

A polymer used to form a waveplate or PLC of the invention preferably can be stretched to a sufficient elongation at conveniently achievable temperatures to achieve the desired birefringence without tearing or degrading.

Figure 1:
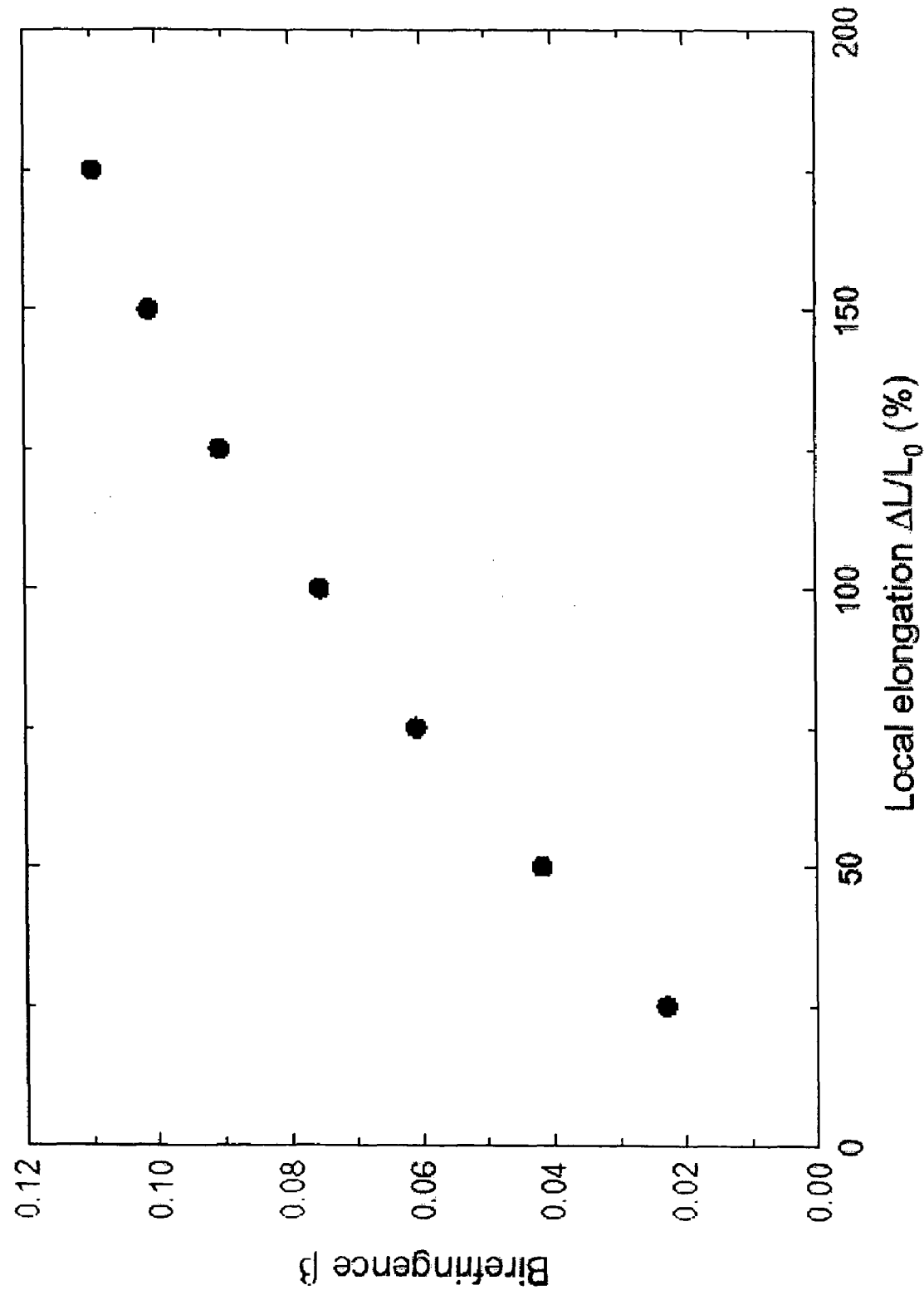
FIG. 1 is a graph of birefringence as a function of the local elongation (localized change in length divided by original length) for an exemplary material.

Preferably, when compared to a non-mesogen-containing but otherwise identical polymer, the mesogen-containing polymer used to form a waveplate or PLC of the invention has a reduced glass-transition temperature and improved drawability at a given temperature (as measured by the amount a polymer film can be stretched without tearing the film). Preferably, it will also have increased birefringence across the plane of the film upon uniaxially drawing a film. Often the birefringence of a film increases approximately linearly with increase in length during stretching as illustrated in FIG. 1 (presumably as increased stretching leads to increased molecular chain alignment while mesogens interact and help maintain alignment), and often the increase in birefringence begins to level off as the film is stretched to high degrees of elongation. The mesogen-containing polymer also preferably may be drawn at a temperature less than 300C, which aids in processing the film without degrading it. In fact, the temperature at which the mesogen-containing polymer may be drawn is often less than the glass transition temperature for the non-mesogen-containing but otherwise identical polymer.

One knowledgeable in the art will understand that the polymer must have sufficiently high molecular weight to allow the necessary mechanical stability to be handled as a thin film, and subsequently stretched to a sufficient birefringence without breaking or tearing. The birefringence attainable by a film generally increases with increasing molecular weight (although this increase levels off for higher molecular weights), so a polymer of this invention must be made with sufficiently high molecular weight to achieve the necessary birefringence for a waveplate. The molecular weight is preferably greater than 30,000 to 100,000, depending on the polymer backbone, and is preferably not so high that the polymer becomes impractical to coat into a thin film and/or draw to achieve high birefringence.

The polymer side-chain formed of the mesogen, linking group, and optional spacer preferably aids in dissolving the polymer in a wide range of solvents. Although the specific solvents depend largely on the backbone, mesogens usually broaden the range of solvents that can be used, often facilitating solubility in solvents such as ethers, ketones, esters, and chlorocarbons as well as the aprotic solvents such as N-methylpyrrolidone which are required for rigid polyimides. This property allows a high-quality thin film to be easily cast from the solution using well-known solution-based thin-film coating methods such as spin coating, which film can be further stretched to induce in-plane birefringence prior to forming one or more waveplates of the invention from the film.

In the '514 patent, it is stressed that the polymer must be very rigid, and a strong preference is expressed for polymers that have no more than two rotatable bonds (swivel bonds) per repeat unit. However, in the several examples in which even two swivel bonds exist, the polymer is not capable of sufficient birefringence to make a waveplate.

Figure 6:
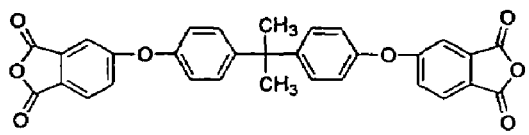
FIG. 6 depicts monomers used to form a mesogen-containing polyetherimide polymer and the resultant polymer that can be used in optical devices of the invention.
Figure 6:
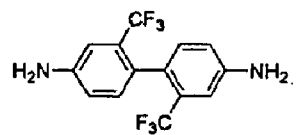
Figure 6:
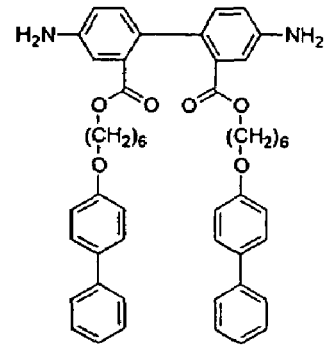
Figure 6:
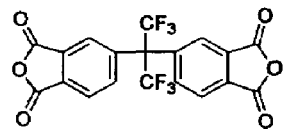
Figure 6:
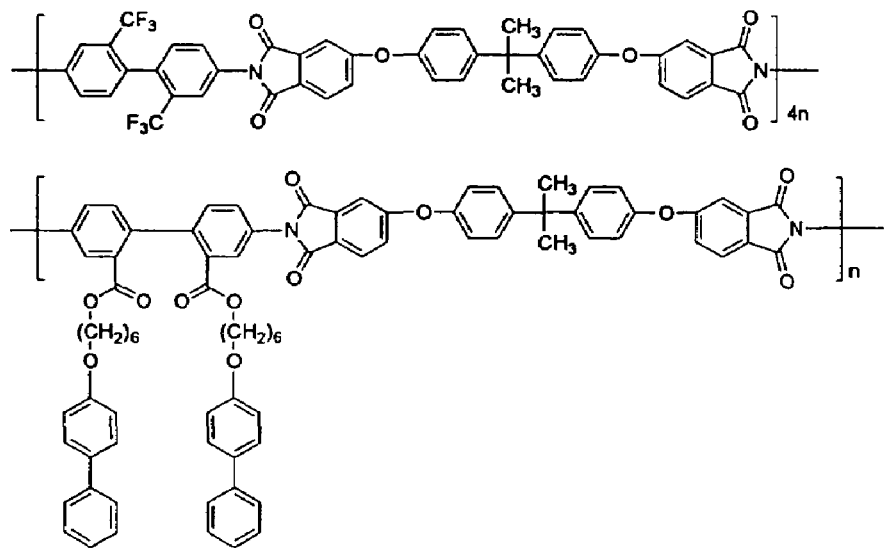

A polymer used to form a waveplate or PLC of the invention is preferably formed to have at least three swivel bonds per repeating unit of the backbone that permit portions of the backbone to rotate relative to one another. Preferably, the polymer has at least four such bonds, more preferably five, and even more preferably six. For example, a polyetherimide as shown in FIG. 6 has two swivel bonds in each of the two ether linkages plus two swivel bonds in the isopropylidene linkage, giving a total of six swivel bonds in a repeating unit of the backbone about which portions of the backbone may rotate. For this polymer, a repeat unit is defined herein as the bis-ADA linked to C6BP (the biphenyl moiety having mesogenic side-chains) or the bis-ADA linked to PFMB (the 2,2'-bis(trifluoromethyl)biphenyl moiety).

The spacers in the sidechains of this polymer are also preferably quite flexible, having numerous points about which the rigid mesogens (e.g. the biphenyl groups of the side chains illustrated in FIG. 6) may rotate. In the polymer illustrated in FIG. 6, a biphenyl group may rotate as a unit about the oxygen atom to which it is attached. The oxygen atoms and methylene units of sidechains are free to move about adjacent methylene units, and the methylene units closest to the backbone are free to rotate about the oxygen atoms of the esters to which the methylenes are attached. The sidechains have a high degree of flexibility, and consequently the sidechains can flex and move to allow the mesogens to associate. Because the mesogens are similar or identical in structure as well as properties and because the mesogens are significantly different in structure and properties from e.g. the spacer and the backbone, it is believed that the mesogens associate to form microdomains within the polymer.

In addition to the presence of the mesogens, the polymer may be further substituted or unsubstituted. If substituted, the substituents preferably do not hinder the film from becoming more birefringent when drawn. Typical substituents include groups such as alkyl, alcoxy, aryl, aralkyl, ester, cyano, nitro, or halogens such as chlorine or fluorine. The backbone, linker, spacer, and/or mesogen may be substituted.

One particularly preferred polymer is:

where y is a number between 0 and 0.25, inclusive. Bis-ADA is 4,4'-bis(4,4'-isopropylidene diphenoxy)-bis(phthalic anhydride) represented by the following formula:

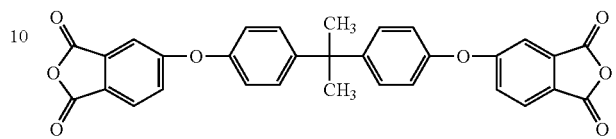

and PFMB is 2,2'-bis(trifluoromethyl)benzidine represented by the following formula:

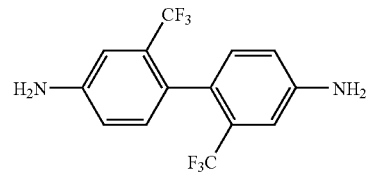

and C6BP (also known as C6PH) is bis{6-[4-biphenyloxy]hexyl}4,4'diamino-2-2'-biphenyldicarboxylate represented by the following formula:

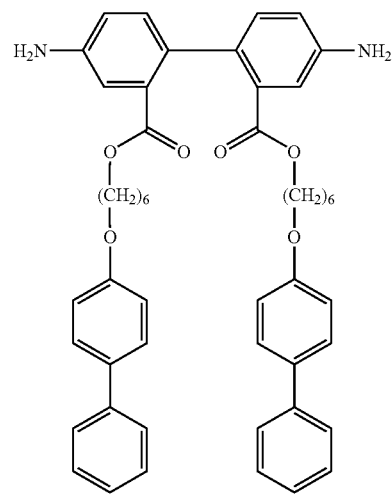

The polymer is a random copolymer, in which the C6BP moiety is distributed randomly along the polymer. A particularly preferred polymer for use is that described by the formula above where y=0.2, as represented in FIG. 6.

Another particularly preferred polymer is the random copolymer:

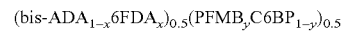

where x is a number between 0 and 0.5, inclusive, and y is a number between 0 and 0.25, inclusive. A particularly preferred polymer for use is that described by the formula above, where x=0.1 and y=0.2. 6FDA is 4,4'-(hexafluoroisopropylidene)diphthalic anhydride represented by the following formula:

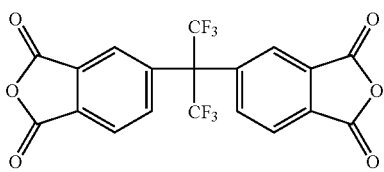

Another particularly preferred polymer is:

(PFMB$_{0.5}$IPC$_{0.5}$)$_x$(C6BP$_{0.5}$IPC$_{0.5}$)$_y$ where y is a value between 0.05 and 0.5 and x=1−y. IPC is isophthalic chloride represented by the following formula:

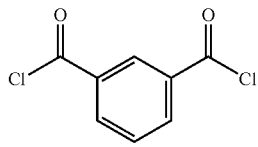

Figure 7:
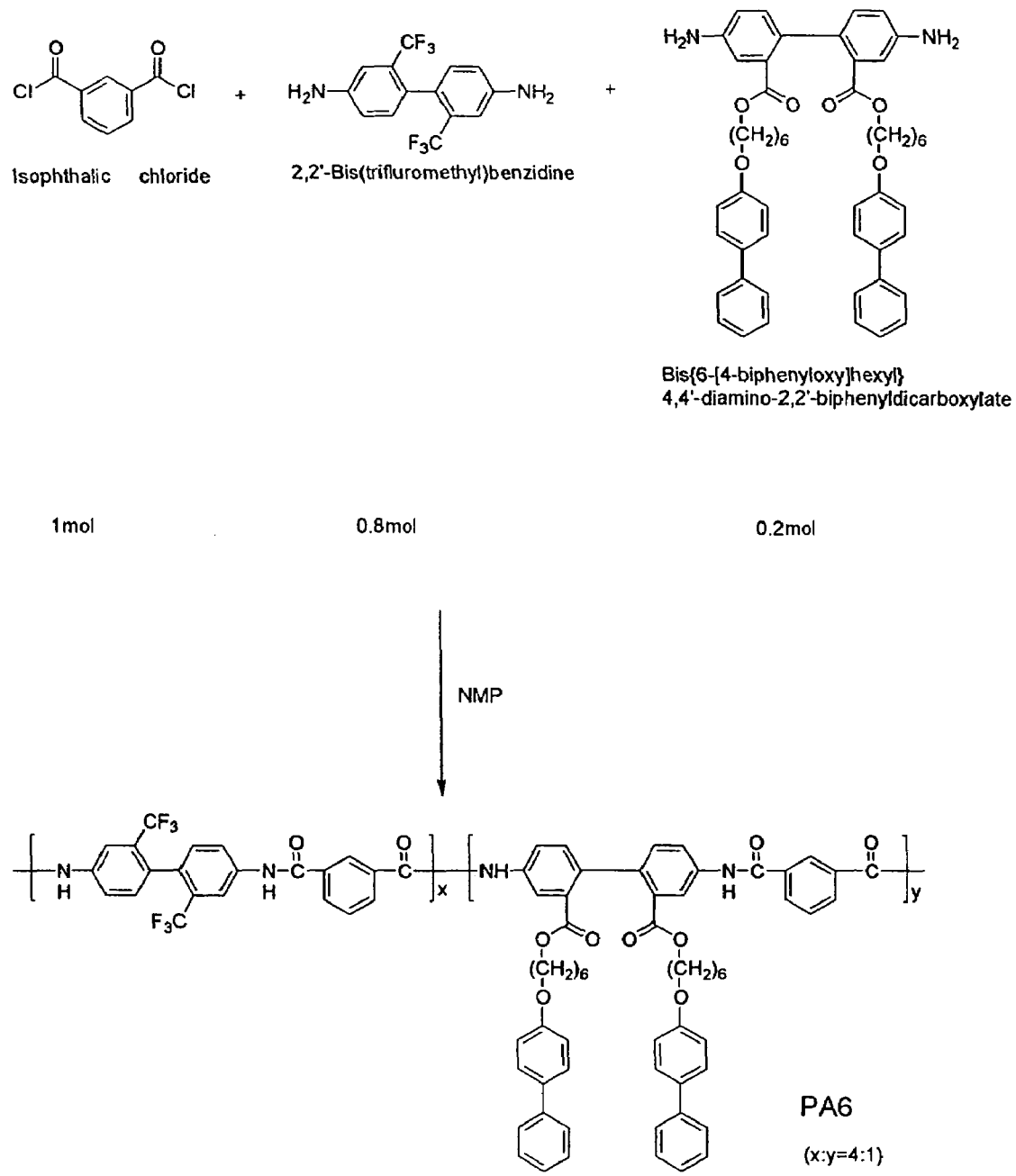
FIG. 7 depicts monomers used to form a mesogen-containing polyamide polymer and the resultant polymer that can be used in optical devices of the invention.

This produces a polyamide random copolymer. A particularly preferred polymer for use is that described by the formula above, where x=0.8 and y=0.2, as illustrated in FIG. 7.

Another polymer that may be useful in the practice of the invention is:

(PFMB$_{0.5}$TPA0.5)$_x$(C6BP$_{0.5}$TPA0.5)$_y$ where y is a value between 0.05 and 0.5 and x=1−y. TPA is terephthalic acid represented by the following formula:

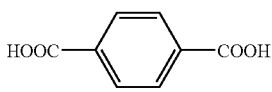

Figure 12:
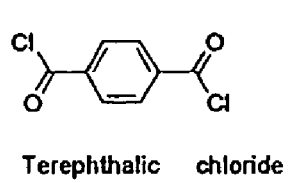
FIG. 12 depicts monomers used to form a mesogen-containing polyamide polymer and the resultant polymer that may be useful in optical devices of the invention.
Figure 12:
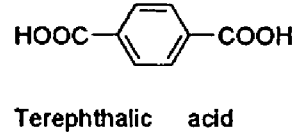
Figure 12:
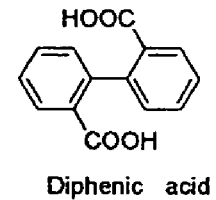
Figure 12:
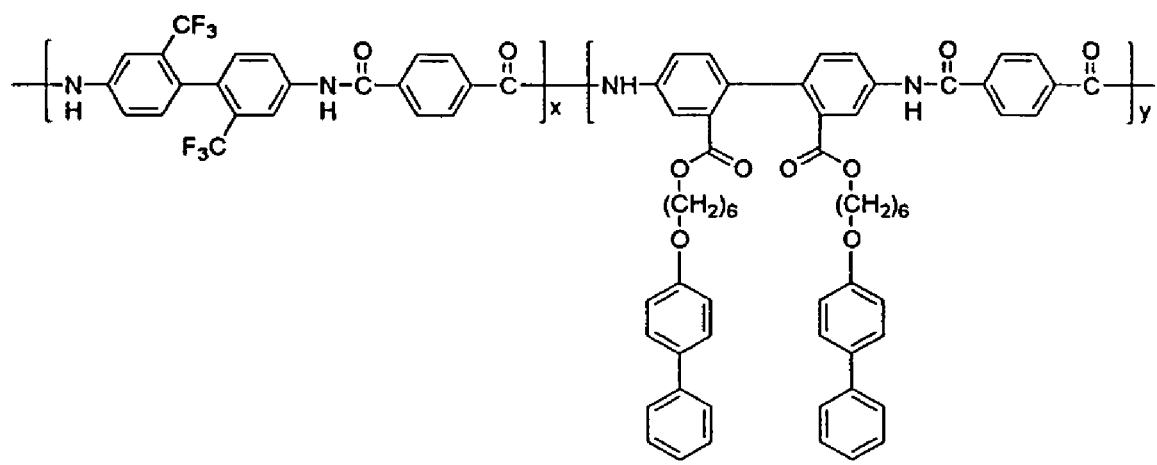

This produces a polyamide random copolymer as illustrated in FIG. 12.

This same polymer can also be made using terephthalic chloride (TCA) instead of TPA, with reaction conditions modified accordingly. TCA is terephthalic chloride represented by the following formula:

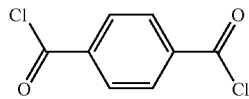

Another polymer that may be useful in the practice of the invention is:

(PFMB$_{0.5}$DPA$_{0.5}$)$_x$(C6BP$_{0.5}$DPA$_{0.5}$)$_y$ where y is a value between 0.05 and 0.5 and x=1−y. DPA is diphenic acid represented by the following formula:

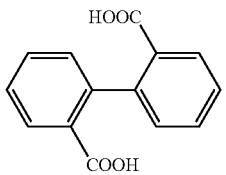

The polymer may be formed by conventional methods used to form other polymers containing mesogens. Consequently, the mesogen-containing polymers may be formed by polymerizing monomers that have mesogens attached, or the polymers may be formed by polymerizing monomers having reactive side-chains and reacting mesogen-containing compounds with the reactive side-chains.

Preferably, the polymers used to make waveplates of the invention require no further reaction to complete the polymers during or after drawing. Certain polymers as disclosed in examples of the '514 patent discussed above must be drawn starting as poly(amic acid) films and imidized after or during the drawing process. The '514 patent teaches that "performing the drawing for a polyimide film which is already imidized and has no in-plane birefringence is ineffective since the consequent in-plane birefringence is small . . . " It is believed that reacting the polymer (in this case imidizing) during or after drawing decreases the repeatability of the final birefringence. The need for polymer reaction also can increase the number of steps in the manufacturing process, increasing cost and reducing yields. In addition, in the case of polyimides, imidization performed while the film is under tensile stress may proceed incompletely, leading to an increased sensitivity of the film to water. In the present invention, certain examples are disclosed of performing drawing of a polymer film which is already imidized and has no in-plane birefringence, with such drawing resulting in a high birefringence suitable for use as waveplates.

Preferably, the polymers used to make waveplates of the invention can be drawn without appreciable solvent in the film. Certain polymers as disclosed in examples of the '514 patent discussed above are drawn with a certain amount of solvent in the poly(amic acid) film, presumably to plasticize the film and allow the rigid poly(amic acid) film to be more readily drawn. In practice it is difficult to control the exact amount of solvent in a film, and thus it is believed that this decreases the repeatability of achieving the desired birefringence from such a film.

Often polymers having mesogen-containing sidechains are not constrained to be stretched in a partially-reacted state or with solvent in the film because they can be easily drawn in their fully-reacted form at temperatures well below 300° C. to achieve the high degree of birefringence necessary for waveplates. The mesogens increase the drawability of the polymer, allowing the fully-reacted polymer to be heated and drawn in a single step to create sufficient birefringence with a very high degree of repeatability and uniformity.

Waveplate manufacturing processes that involve self-shrinking films, or involve drawing films with appreciable solvent content, or involve reactions such as imidizing after stretching may have more variability and may be hard to control. Such films may require in-situ monitoring of birefringence during the drawing process, or additional processes to fine-tune the birefringence after the drawing process. Preferably, waveplates of the invention can be drawn to a desired birefringence value at reasonable temperatures below 300° C. without need for subsequent fine-tuning, and without the need for in-situ monitoring of the drawing or fine-tuning processes.

A waveplate formed using a polymer as described above may be more resistant to heat and to humidity. The polymer may contain few groups that react with or associate with water, even under elevated temperatures. Further, the lower processing temperature (i.e. below 300C) made possible by certain polymers of the invention helps to prevent water vapor from reacting with or associating with components of the polymer, thus helping to assure resistance to heat and humidity.

A waveplate for a PLC is formed by making a thin polymer film of suitable thickness that the finished waveplate may fit into a thin cavity (about 30 µm thick or less), cut or etched into the PLC, the length of the cavity bridging a waveguide or waveguides of interest on a PLC and the width or height of the cavity (i.e. distance into the interior of the PLC from the outer surface of the PLC that is parallel to the waveguides of the PLC) being sufficient to cut across the height of the waveguides of interest. The thin polymer film is thus typically less than 30 µm thick. Although the cavity in the PLC is typically 50–300 µm in height, the waveplate is typically 1–3 mm tall for ease of handling during insertion into the cavity.

The film is preferably formed from a liquid solution of the polymer in solvent by methods of solvent casting known in the art (using wirewound rod, doctor blade, Bird applicator, or spin coating, for instance) onto a suitable substrate such as a silicon wafer or glass plate. The film is preferably made quite large for ease of handling and increased uniformity, formed on a substrate typically 6–12 inches in diameter for a round substrate, or 6–12 inches per side for a rectangular substrate. The film is properly dried to substantially remove the solvent, (e.g. by heating) and peeled from the substrate. A release agent may be used on the substrate to allow the film to be easily separated from the substrate. A solvent or water may be used to aid in separating the film from the substrate. Alternatively, the film can be made directly from polymer without a substrate using methods such as blow-forming or extrusion.

The film is then cut to an appropriate size for a stretching apparatus. It is heated to a desired temperature, typically within 20° C. of the glass transition temperature, and stretched uniaxially or biaxially using conventional techniques to obtain a thin polymer film of the desired thickness and birefringence. It is simplest, and thus preferable, that the film thickness is chosen such that the film can be stretched uniaxially to achieve the desired birefringence and thickness. Alternatively a thicker film can be made and stretched biaxially (with different amounts of stretch along each of the two axes) to achieve the desired birefringence and thickness. It is postulated that the polymer chains generally align along the axis of the direction of greatest stretch (the "x" direction in the plane of the film, with the "y" direction being in the plane of the film and orthogonal to the "x" direction and the "z" direction being orthogonal to both the "x" and "y" directions). This generally provides a film in which the refractive index in the "x" direction is greater than the refractive index in the "y" direction, both of which are generally different from the refractive index in the "z" direction. Thus, light traveling generally along the "z" axis encounters birefringence caused primarily by the different refractive indices in the "x" and "y" axes.

The waveplate of the invention is typically biaxially birefringent. Such waveplates, as described above, exhibit a difference in refractive index along each of the x, y, and z axes of the film. By contrast, films of polymers as produced for liquid crystal display compensation layers are typically uniaxially birefringent because these films have a constant refractive index along two of the axes (typically the x and y axes in the plane of the film), and a differing refractive index along the third axis (typically the z axis perpendicular to the plane of the film, along which light is transmitted).

Alternatively, the polymer can be solvent-cast onto a continuous substrate consisting of another polymer (such as polycarbonate) or a metal belt, using a continuous-roll solvent-casting and drying apparatus. In such a system it is possible to delaminate the polymer web from the substrate and uniaxially stretch the polymer web in the same apparatus. In this way a continuous roll of polymer of the desired birefringence and thickness can be formed.

After the polymer film is stretched, it is typically less than 30 µm thick, more typically 10–15 µm thick, with birefringence necessary to achieve quarter waveplate or half waveplate function at the desired operating wavelength.

After the thin polymer film is stretched to the desired birefringence and thickness, it is then cut using a blade or shear, stamp or punch, laser, or another conventional technique to form the waveplate. The waveplate is cut from the film at an angle appropriate for the desired use of the waveplate. For the typical uses of rotating TE to TM and TM to TE polarizations in a PLC using a half waveplate, or changing linear polarizations to circular polarizations and circular polarizations to linear polarizations in a PLC using a quarter waveplate, this angle is 45° from the "x" axis, or stretch axis, of the film. While the invention is not limited to the following dimensions, a waveplate suitable for a PLC having an arrayed waveguide grating typically has a thickness of about 15 µm, a height of about 2 mm, and a length of about 8 mm. The length of a waveplate suitable for use in a PLC typically is between 1 mm and 15 mm, more typically between 5 mm and 10 mm, the height is typically between 1 mm and 3 mm, and the thickness is as discussed previously.

Preferably, the waveplate of the invention is capable of large polarization conversion ratios. That is, if linearly-polarized light incident upon a waveplate with its fast axis oriented at 45 degrees to the polarization of the incoming light, and an analyzer is used to detect the optical energy polarized perpendicular to and parallel to the polarization direction of the incident beam, the ratio of these optical energies is large. Preferably this ratio is greater than 25 dB, more preferably greater than 30 dB.

EXAMPLES OF PLCS

The waveplate is inserted into the optical path of a waveguide. In some instances, a small channel is etched or cut or "diced" into one or more waveguides of the PLC, and a transmissive waveplate is inserted into the channel. In other instances, a reflective waveguide is attached to the side of a substrate in the optical path of one or more waveguides to form a reflective waveplate.

Figure 8:
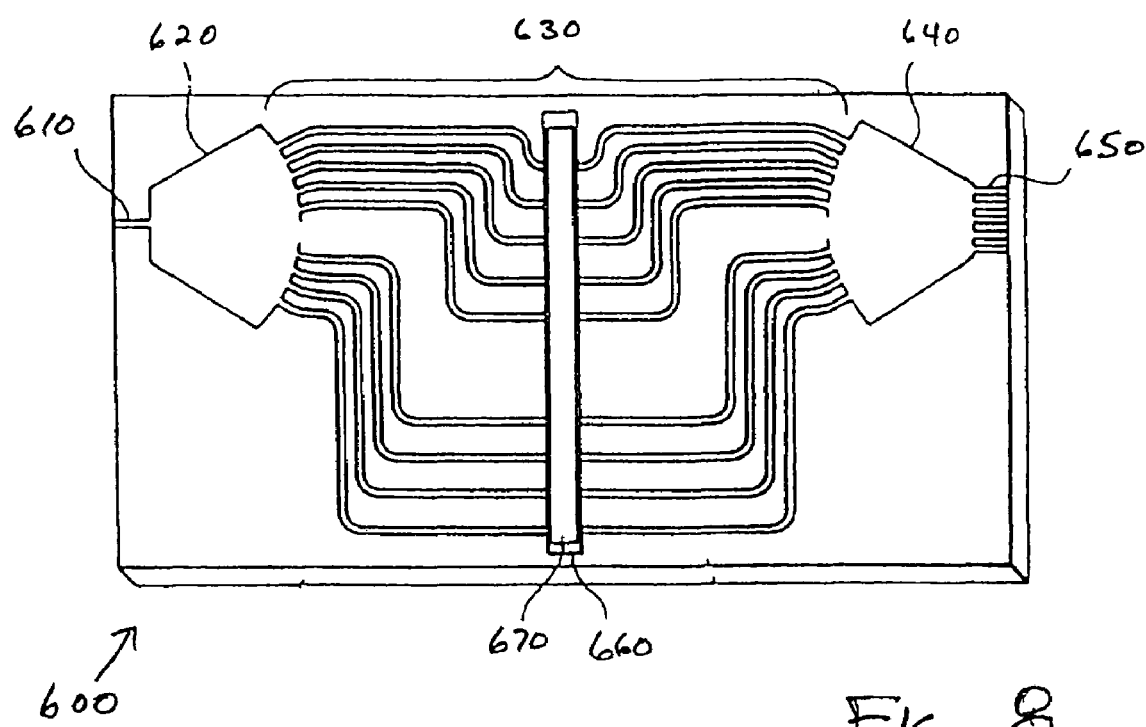
FIG. 8 illustrates a PLC of the invention, an arrayed waveguide grating.

FIG. 8 illustrates an arrayed waveguide grating (AWG) 600 as an example of a PLC into which a waveplate of the invention may be inserted. AWG 600, which is configured as a demultiplexer, has an input waveguide 610, a first lens or expansion region 620, an array of unequal length waveguides 630, a second lens 640, and multiple output waveguides 650 that each receive an individual wavelength of light diffracted to it from the waveguides of the array through the second lens. Channel 660 cut into the surface of the SiO$_2$ waveguides and cladding contains transmissive waveplate 670 made of a waveplate polymer as described herein. The waveplate is generally positioned at or near the center of the waveguide array so that it compensates for the birefringence of the waveguides of the array.

Figure 9:
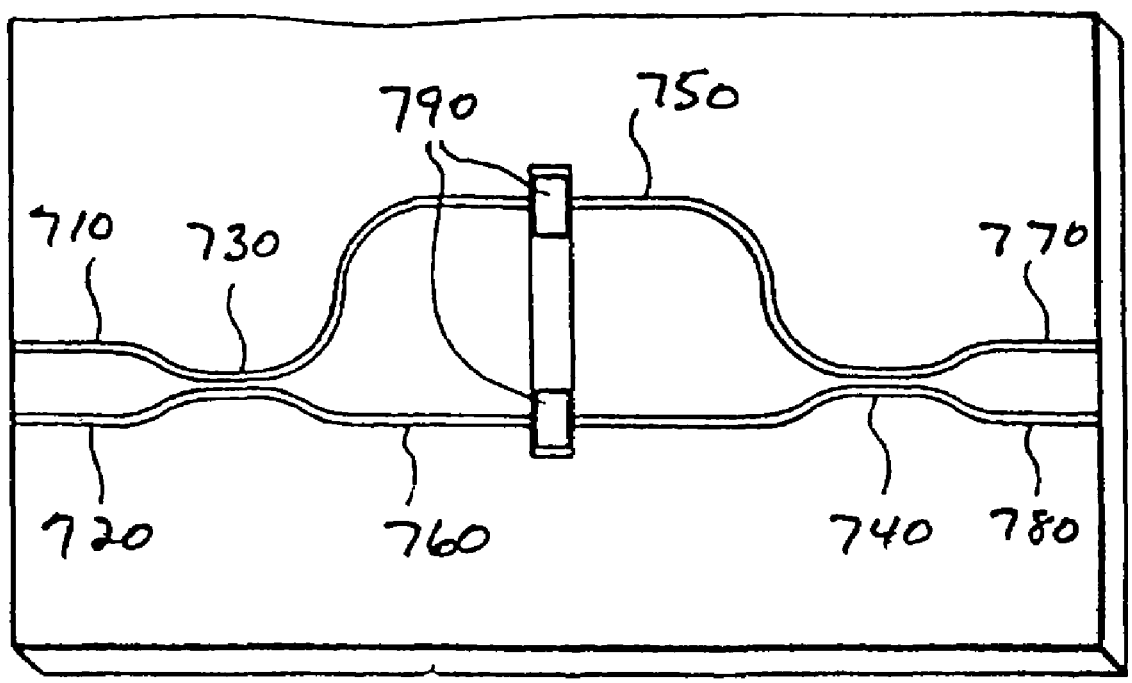
FIG. 9 illustrates another PLC of the invention, a wavelength division multiplexer based on a Mach-Zehnder interferometer.

A wavelength multiplexer based on a Mach-Zehnder interferometer (MZI) is another PLC into which a waveplate of the invention may be inserted. FIG. 9 illustrates first 710 and second 720 input waveguides, first 730 and second 740 50% couplers, first 750 and second 760 Mach-Zehnder arm waveguides, and first 770 and second 780 output waveguides. A waveplate of the invention 790 is inserted into the waveguides of the MZI as illustrated to compensate for birefringence in the SiO$_2$ waveguides of the MZI. A waveplate of the invention may be used to form any of the optical devices illustrated in U.S. Pat. No. 6,115,514, the disclosure of which is incorporated by reference in its entirety herein.

EXAMPLES OF WAVEPLATES

Example 1

A first waveplate polymer is formulated using 4 parts PFMB, 1 part C6BP, and 5 parts bis-ADA in m-cresol to yield a random polymer having the general formula shown in FIG. 6. The copolymer is formed using the following formulation.

PFMB (15.18 g, 47.41 mmol), C6BP (9.21 g, 11.86 mmol) and m-cresol (345 g) were added to a 500 ml three-necked round bottom flask equipped with a mechanical stirrer, a nitrogen inlet, and a distillation head. After the diamine monomers dissolved in m-cresol, 4,4'-(4,4'-isopropylidenediphenoxy)bis(phthalic anhydride) (bis-ADA) (30.24 g, 58.10 mmol) was added and the mixture was stirred at room temperature for one day. Isoquinoline (0.5 ml) was added and the reaction temperature was raised to 202° C. for 15 hours. After the solution was allowed to cool to room temperature, it was slowly added to methanol to precipitate the polymer. The polymer was dissolved in chloroform and re-precipitated in methanol and dried in vacuum oven.

This waveplate polymer is formed into a film by dissolving the polymer in a solvent such as cyclopentanone at 10–15% concentration, filtering the solution, and casting a sheet of approximately 20–40 micron thickness using rod coating (Mayer) or Bird coating and drying the coating in an oven or on a hotplate. The glass-transition temperature of the film is measured to be Tg=155° C. The resultant sheet is heated to near or over its glass transition temperature and stretched uniaxially at this temperature and at a rate of about 0.25 mm per second to form a film. The film is cooled and tested, and waveplates are cut from the cooled film at a 45 degree angle to the stretch direction.

Figure 2:
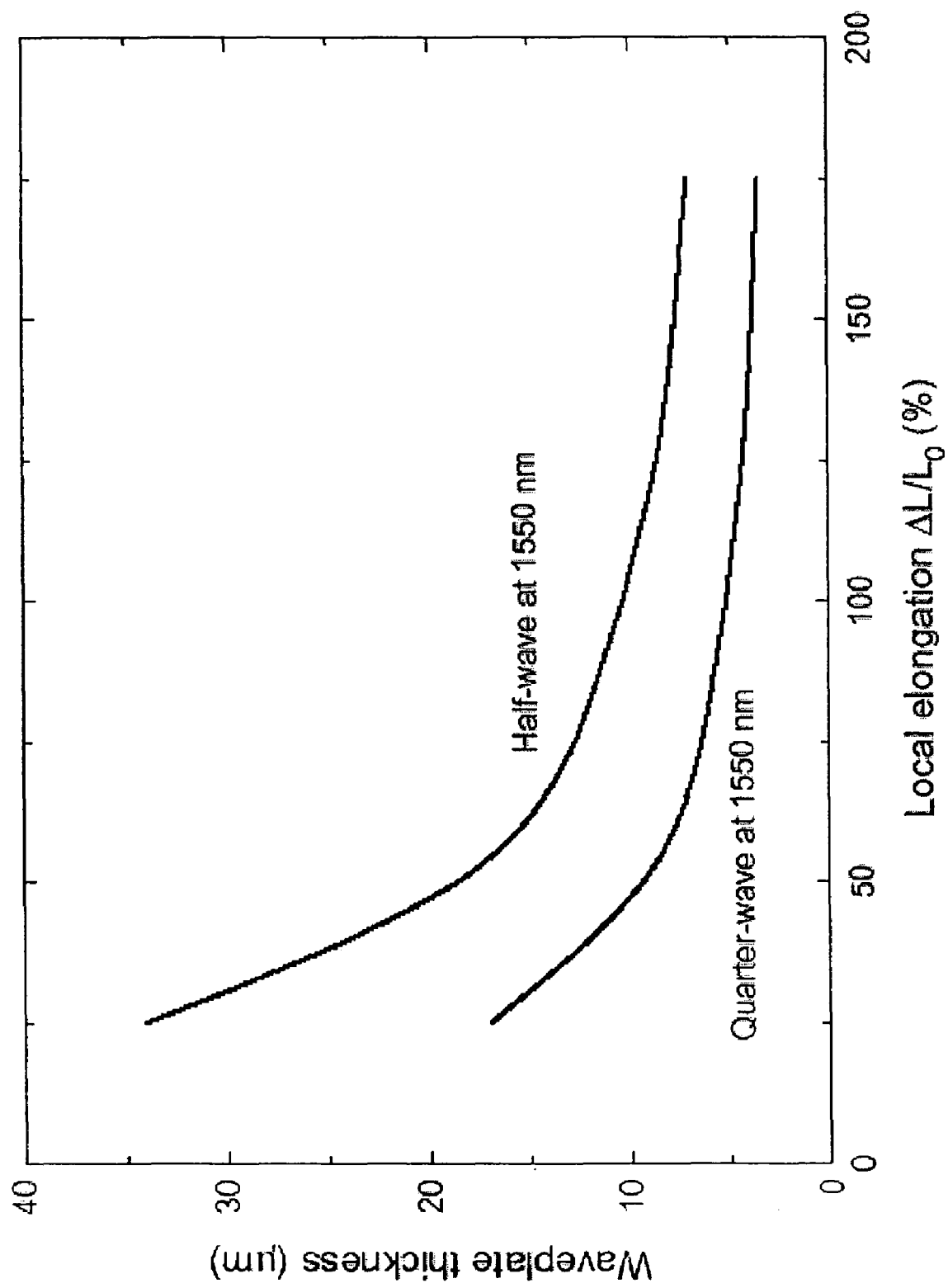
FIG. 2 shows the thickness of a half waveplate and a quarter waveplate made from the material of FIG. 1, as a function of the local elongation.

FIG. 1 illustrates the birefringence of this film as measured in the x and y directions as a function of the amount that a small section at the center of the film has been stretched over its original size in the x direction ("local elongation" (%)). The birefringence increases monotonically with amount of stretch, and the amount of increase is sufficiently high to make a 15 μm thick half waveplate at 1550 nm wavelength. From this information, on can calculate the desired local elongation for any desired waveplate thickness. FIG. 2 shows the calculated thickness of a half waveplate at 1550 nm wavelength and a quarter waveplate at 1550 nm wavelength as a function of the local elongation. Thus a half waveplate for 1550 nm wavelength can be created with thickness ranging from above 30 μm to below 10 μm.

Example 2

A polymer film is formed, and heated and stretched according to Example 1. After the film is stretched it is annealed in an oven at 145° C. for two hours. The thickness of the pre-stretched film and the degree of elongation during the stretch are chosen such that after the film is stretched and annealed, the thickness of the film is approximately 15.6 μm, and the retardance is one half wave at a wavelength of about 1550 nm. A waveplate is cut from the film at a 45 degree angle to the stretch direction. The waveplate is tested by illuminating it with polarized light at approximately 1550 nm wavelength polarized along the direction of the cut of the waveplate (and thus at about a 45 degree angle to the stretch axis of the waveplate). The light that is transmitted through the waveplate is passed through a polarizer used as an analyzer. The optical power transmitted through the analyzer is measured with the analyzer perpendicular to the polarization of the input laser light, and again with the analyzer parallel to the polarization of the input light. The ratio of these two measurements is found to be 31.9 dB. This demonstrates that this film functions as a half waveplate and makes a polarization rotator with high extinction ratio.

Example 3

Two waveplates according to Example 2 are formed, one with retardance 0.47 waves and one with retardance 0.67 waves at about 1550 nm wavelength. The waveplates are tested for birefringence and then baked on a hotplate at 125° C. for 2 hours, retested, and then baked several more times, being retested after 8, 24, 48, 96, 192, and 288 hours on the hotplate at 125° C. During this test, no measurable changes are detected in waveplate retardance, demonstrating that the waveplates are thermally stable up to 125° C.

Example 4

Twelve waveplates are formed according to Example 2 each with birefringence of about 0.5 waves at about 1550 nm wavelength and measured for retardance. The first four waveplates are exposed to 85° C. at 85% relative humidity (RH) for 500 hours, being measured after 24, 120, and 500 hours. No measurable changes in retardance are detected, indicating that the waveplates are stable under high heat and humidity. The second four waveplates are exposed to 122° C., 98% RH, and 2 atmospheres of pressure for 24 hours, being measured after 8 and 24 hours. No measurable changes in retardance are detected, indicating that the waveplates are stable under very high heat, humidity, and pressure. The last four waveplates are exposed to thermal shock, being alternately exposed to 0° C. and 100° C. temperatures for 15 cycles. The waveplates are measured after the 15 cycles, and no measurable changes in retardance are detected, indicating that the waveplates are stable under thermal shock.

Example 5

Eight arrayed-waveguide grating (AWG) chips are prepared using silica-on-silicon PLC technology. They are then tested for all performance parameters typically associated with AWG devices, including insertion loss (IL), polarization dependent loss (PDL), uniformity, ripple, adjacent isolation, non-adjacent isolation, total isolation, and polarization-dependent center-wavelength shift (PDW). Grooves about 20 μm wide are cut into the chips in the center of the AWG grating using a dicing saw. Eight half waveplates at 1550 nm wavelength about 15 μm thick are formed according to Example 2 and glued into the diced grooves of the AWG chips. All chips are then retested for the same performance parameters and it is found that the waveplates significantly improve PDL and PDW, thus showing that the waveplates compensate for birefringence in the PLC AWG. The first four chips are then exposed to 122° C., 98% RH, and 2 atmospheres of pressure for 68 hours, being remeasured for the same performance parameters after 8 and 68 hours. No measurable changes attributed to the waveplate are detected, indicating that the waveplates of this invention, when inserted into AWG chips, are stable under very high heat, humidity, and pressure. The second four chips are exposed to thermal shock, being alternately exposed to 0° C. and 100° C. temperatures for 100 cycles. The chips are remeasured for the same performance parameters after the 100 cycles, and no measurable changes are detected, indicating that the waveplates of this invention, when inserted into AWG chips, are stable under thermal shock. The same second four chips are then exposed to 85° C. at 85% RH for 500 hours, being remeasured for the same performance parameters after 214 and after 500 hours. No measurable changes are detected, indicating that the waveplates of this invention, when inserted into AWG chips, are stable under high heat and humidity.

Example 6

Nine pre-tested arrayed-waveguide grating (AWG) chips, each with a half waveplate of this invention glued into the chip according to Example 5, are prepared. Optical fiber ribbons are attached to the chips and the chips are fully packaged, including temperature stabilization, using processes well-known in the PLC industry. These packaged AWG devices are then tested for all performance parameters typically associated with AWG devices as in Example 4. Once again it is found that the waveplates compensate for birefringence in the AWG devices. The first four packaged AWGs are then exposed to 85° C. at 85% RH for 500 hours and are remeasured for the same performance parameters. No measurable changes are detected, indicating that the waveplates of this invention, when inserted into AWG chips and packaged, are stable under high heat and humidity. The second four packaged AWGs are exposed to thermal cycles, each cycle consisting of successive exposure to −40° C., 21° C., 75° C., and 21° C. for 1 hour at each temperature, with a temperature rise and fall time of 0.95° C. per minute, repeating for 63 cycles. The packaged AWG's are remeasured for the same performance parameters after 42 and 63 cycles. No measurable changes are detected, indicating that the waveplates of this invention, when inserted into AWG chips and packaged, are stable under thermal cycling. The ninth packaged AWG is exposed to high laser power, by launching 2 watts of optical power at approximately 1480 nm wavelength into the input optical fiber of the AWG for a period of one week. The package AWG is then remeasured for the same performance parameters, and no measurable changes are detected, indicating that the waveplates of this invention, when inserted into AWG chips and packaged, are stable under high laser power.

Example 7

A second waveplate polymer is formulated using 5 parts IPC, 4 parts PFMB, and 1 part C6BP, reacted in N-methylpyrrolidone (NMP) to form a polyamide random copolymer. The polymer is formed into a film using a method similar to the polymer Example 1. The glass-transition temperature is measured to be Tg=216° C. The resultant sheet is heated to near or over its glass transition temperature and stretched uniaxially at this temperature and at a rate of about 0.25 mm per second to form a film. The film is cooled and tested, and waveplates are cut from the cooled film at a 45 degree angle to the stretch direction.

Figure 3:
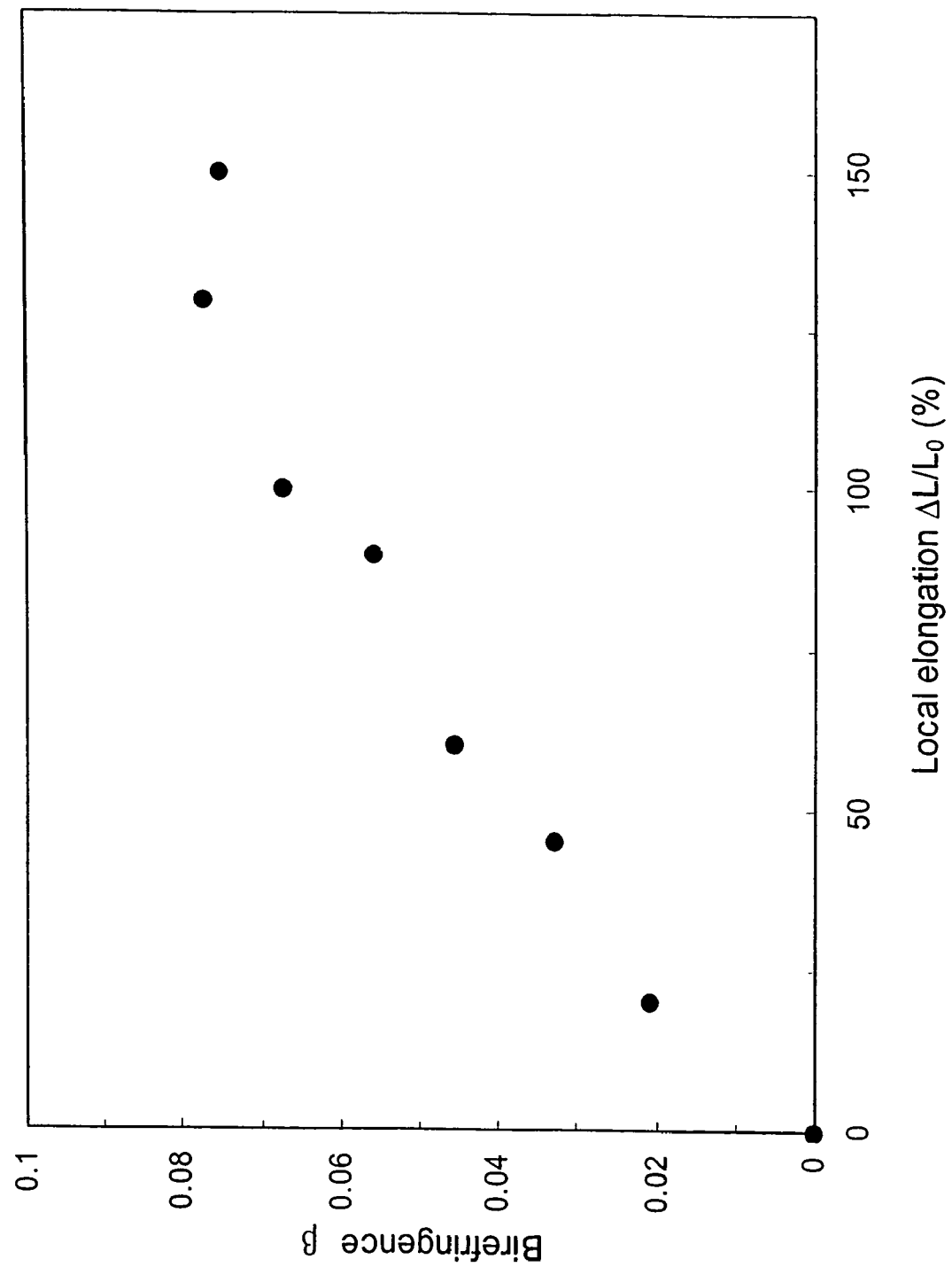
FIG. 3 is a graph of birefringence as a function of the local elongation (localized change in length divided by original length) for another exemplary material.
Figure 4:
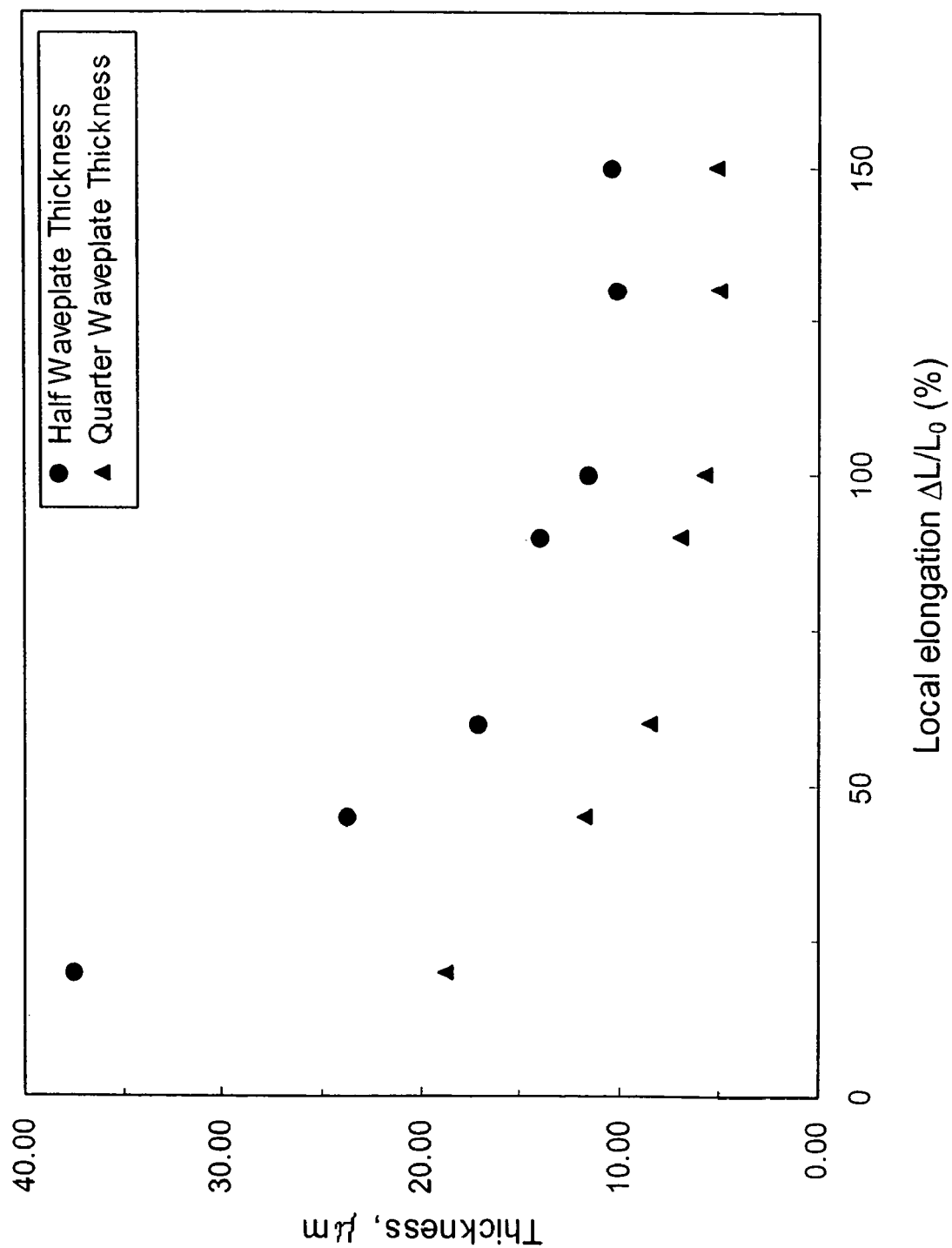
FIG. 4 shows the thickness of a half waveplate and a quarter waveplate made from the material of FIG. 3, as a function of the local elongation.

FIG. 3 illustrates the birefringence of this film as measured in the x and y directions as a function of the amount that a small section at the center of the film has been stretched over its original size in the x direction ("local elongation" (%)). The birefringence increases monotonically with amount of stretch, and the amount of increase is sufficiently high to make a 15 μm thick half waveplate at 1550 nm wavelength. From this information, on can calculate the desired local elongation for any desired waveplate thickness. FIG. 4 shows the calculated thickness of a half waveplate at 1550 nm wavelength and a quarter waveplate at 1550 nm wavelength as a function of the local elongation. Thus a half waveplate for 1550 nm wavelength can be created with thickness ranging from above 30 μm to below 12 μm.

Example 8

A polymer film is formed, and heated and stretched according to Example 7. After the film is stretched it is annealed in an oven at 145° C. for 3.5 hours. The thickness of the pre-stretched film and the degree of elongation during the stretch are chosen such that after the film is stretched and annealed, the thickness of the film is approximately 16.3 μm, and the retardance is one half wave at a wavelength of about 1550 nm. A waveplate is cut from the film at a 45 degree angle to the stretch direction. The waveplate is tested by illuminating it with polarized light at approximately 1550 nm wavelength polarized along the direction of the cut of the waveplate (and thus at about a 45 degree angle to the stretch axis of the waveplate). The light that is transmitted through the waveplate is passed through a polarizer used as an analyzer. The optical power transmitted through the analyzer is measured with the analyzer perpendicular to the polarization of the input laser light, and again with the analyzer parallel to the polarization of the input light. The ratio of these two measurements is found to be greater than 28 dB. This demonstrates that this film functions as a half waveplate and makes a polarization rotator with high extinction ratio.

Example 9

A third waveplate polymer is formulated using 1 part bis-ADA and 1 part C6BP using processing analogous to that of Example 1. The waveplate polymer is dissolved in NMP at 3–5% concentration and made into a thin film by depositing the polymer solution on a glass substrate and baking out the solvent on a covered hotplate. The film is drawn uniaxially at 90C to three times its starting length (i.e. draw ratio of 200%), and the stretched film having a thickness of 14 micron is almost transparent. The refractive indices in the plane of the film parallel and perpendicular to the stretch direction are measured in a prism coupler manufactured by Metricon at wavelength 633 nm. In the stretch direction the refractive index is measured twice, giving values of 1.7116 and 1.7122. In the direction perpendicular to the stretch direction the refractive index is again measured twice, giving values of 1.6135 and 1.6137. From this the birefringence wavelength is calculated to be 0.098, indicating that the polymer has achieved high birefringence. The birefringence of the film at 1550 nm is estimated to be 0.094. Thus with this amount of stretch, this polymer is suitable for a half waveplate at 1550 nm with 8.3 µm thickness.

Example 10

A polymer waveplate is formed using the polymer and procedure of Example 9, but the waveplate polymer is drawn uniaxially at 100° C. to twice its starting length (i.e. draw ratio of 100%), and the stretched film having a thickness of 9.5–10 microns is transparent and colorless. The refractive indices in the plane of the film parallel and perpendicular to the stretch direction are measured in a prism coupler manufactured by Metricon at wavelength 633 nm. In the stretch direction the refractive index is measured twice, giving values of 1.6941 and 1.6941. In the direction perpendicular to the stretch direction the refractive index is again measured twice, giving values of 1.6128 and 1.6128. From this the birefringence at 633 nm wavelength is calculated to be 0.081. The retardance of the film is subsequently measured at wavelength of about 1550 nm to be 0.45 waves. The birefringence at 1550 nm is thus calculated to be 0.070. Thus with this amount of stretch, this polymer is suitable for a half waveplate at 1550 nm with 11.1 µm thickness.

Example 11

A polymer waveplate is formed using the polymer and procedure of Example 10, but the waveplate polymer is drawn to a draw ratio of 80%. The thickness of the film prior to stretching is 16 micron, and the thickness after stretching is 10 micron. The film is transparent and colorless. The refractive indices in the plane of the film parallel and perpendicular to the stretch direction are measured in a prism coupler manufactured by Metricon at wavelength 633 nm. In the stretch direction the refractive index is measured twice, giving values of 1.6910 and 1.6908. In the direction perpendicular to the stretch direction the refractive index is again measured twice, giving values of 1.6152 and 1.6152. From this the birefringence at 633 nm is calculated to be 0.076, indicating that the polymer has achieved high birefringence. The retardance of the film is subsequently measured at wavelength of about 1550 nm to be 0.36 waves. The birefringence at 1550 nm is thus calculated to be 0.056. Thus with this amount of stretch, this polymer is suitable for a half waveplate at 1550 nm with 13.9 µm thickness.

Example 12

A fourth waveplate polymer is formulated of 4 parts 6FDA, 3 parts PFMB, and 1 part C6BP, and the waveplate polymer is drawn uniaxially in the x direction at 200C to a draw ratio of 100% and a thickness of 12 micron. The refractive indices in the plane of the film parallel and perpendicular to the stretch direction are measured in a prism coupler manufactured by Metricon at wavelength 633 nm. In the stretch direction the refractive index is measured twice, giving values of 1.6111 and 1.6112. In the direction perpendicular to the stretch direction the refractive index is again measured twice, giving values of 1.5567 and 1.5569. From this the birefringence at 633 nm is calculated to be 0.054, indicating that the polymer has achieved high birefringence. The birefringence of the film at 1550 nm is estimated to be 0.052. Thus with this amount of stretch, this polymer is suitable for a half waveplate at 1550 nm with 15 µm thickness.

Example 13

A waveplate polymer is formulated 4 parts 6FDA, 3 parts PFMB, and 1 part C6BP, and the waveplate polymer is drawn uniaxially in the x direction at 210C to a draw ratio of 100% and a thickness of 12 micron. The refractive indices in the plane of the film parallel and perpendicular to the stretch direction are measured in a prism coupler manufactured by Metricon at wavelength 633 nm. In the stretch direction the refractive index is measured twice, giving values of 1.6215 and 1.6222. In the direction perpendicular to the stretch direction the refractive index is again measured-twice, giving values of 1.5540 and 1.5560. From this the birefringence at 633 nm is calculated to be 0.067, indicating that the polymer has achieved high birefringence. The birefringence of the film at 1550 nm is estimated to be 0.064. Thus with this amount of stretch, this polymer is suitable for a half waveplate at 1550 nm with 12.2 µm thickness.

Example 14

A waveplate polymer is formulated 4 parts 6FDA, 3 parts PFMB, and 1 part C6BP, and the waveplate polymer is drawn uniaxially in the x direction at 215C to a draw ratio of 100% and a thickness of 13 micron. The refractive indices in the plane of the film parallel and perpendicular to the stretch direction are measured in a prism coupler manufactured by Metricon at wavelength 633 nm. In the stretch direction the refractive index is measured twice, giving values of 1.6156 and 1.6152. In the direction perpendicular to the stretch direction the refractive index is again measured twice, giving values of 1.5571 and 1.5571. From this the birefringence at 633 nm is calculated to be 0.058, indicating that the polymer has achieved high birefringence. The birefringence of the film at 1550 nm is estimated to be 0.055. Thus with this amount of stretch, this polymer is suitable for a half waveplate at 1550 nm with 14 µm thickness.

Example 15

A waveplate polymer is formulated 4 parts 6FDA, 3 parts PFMB, and 1 part C6BP, and the waveplate polymer is drawn uniaxially in the x direction at 220C to a draw ratio of 80% and a thickness of 12.5 micron. The refractive indices in the plane of the film parallel and perpendicular to the stretch direction are measured in a prism coupler manufactured by Metricon at wavelength 633 nm. In the stretch direction the refractive index is measured twice, giving values of 1.6159 and 1.6158. In the direction perpendicular to the stretch direction the refractive index is again measured twice, giving values of 1.5542 and 1.5545. From this the birefringence at 633 nm is calculated to be 0.062, indicating that the polymer has achieved high birefringence. The birefringence of the film at 1550 nm is estimated to be 0.058. Thus with this amount of stretch, this polymer is suitable for a half waveplate at 0.1550 nm with 13.2 µm thickness.

Example 16

A waveplate polymer is formulated 4 parts 6FDA, 3 parts PFMB, and 1 part C6BP, and the waveplate polymer is drawn uniaxially in the x direction at 230C to a draw ratio of 93.75% and a thickness of 14 micron. The refractive indices in the plane of the film parallel and perpendicular to the stretch direction are measured in a prism coupler manufactured by Metricon at wavelength 633 nm. In the stretch direction the refractive index is measured multiple times, giving average value 1.6098. In the direction perpendicular to the stretch direction the refractive index is again measured, giving average value 1.5622. From this the birefringence at 633 nm is calculated to be 0.048, indicating that the polymer has achieved high birefringence. The retardance of the film is subsequently measured at wavelength of about 1550 nm to be 0.38 waves. The birefringence at 1550 nm is thus calculated to be 0.042. Thus with this amount of stretch, this polymer is suitable for a half waveplate at 1550 nm with 18.3 μm thickness.

Example 17

A waveplate polymer is formulated 4 parts 6FDA, 3 parts PFMB, and 1 part C6BP, and the waveplate polymer is drawn uniaxially in the x direction at 230C to a draw ratio of 110% and a thickness of 14 micron. The refractive indices in the plane of the film parallel and perpendicular to the stretch direction are measured in a prism coupler manufactured by Metricon at wavelength 633 nm. In the stretch direction the refractive index is measured multiple times, giving average value 1.6207. In the direction perpendicular to the stretch direction the refractive index is again measured, giving average value 1.5600. From this the birefringence at 633 nm is calculated to be 0.061, indicating that the polymer has achieved high birefringence. The retardance of the film is subsequently measured at wavelength of about 1550 nm to be 0.53 waves. The birefringence at 1550 nm is thus calculated to be 0.059. Thus with this amount of stretch, this polymer is suitable for a half waveplate at 1550 nm with 13.2 μm thickness.

Example 18

A waveplate polymer is formulated 4 parts 6FDA, 3 parts PFMB, and 1 part C6BP, and the waveplate polymer is drawn uniaxially in the x direction at 240C to a draw ratio of 107% and a thickness of 13.5 micron. The refractive indices in the plane of the film parallel and perpendicular to the stretch direction are measured in a prism coupler manufactured by Metricon at wavelength 633 nm. In the stretch direction the refractive index is measured multiple times, giving average value 1.6181. In the direction perpendicular to the stretch direction the refractive index is again measured, giving average value 1.5602. From this the birefringence at 633 nm is calculated to be 0.058, indicating that the polymer has achieved high birefringence. The retardance of the film is subsequently measured at wavelength of about 1550 nm to be 0.47 waves. The birefringence at 1550 nm is thus calculated to be 0.054. Thus with this amount of stretch, this polymer is suitable for a half waveplate at 1550 nm with 14.2 μm thickness.

Example 19

A waveplate polymer is formulated 4 parts 6FDA, 3 parts PFMB, and 1 part C6BP, and the waveplate polymer is drawn uniaxially in the x direction at 230C to a draw ratio of 100% and a thickness of 16.5 micron. The refractive indices in the plane of the film parallel and perpendicular to the stretch direction are measured in a prism coupler manufactured by Metricon at wavelength 633 nm. In the stretch direction the refractive index is measured multiple times, giving average value 1.6104. In the direction perpendicular to the stretch direction the refractive index is again measured, giving average value 1.5642. From this the birefringence at 633 nm is calculated to be 0.046, indicating that the polymer has achieved high birefringence. The retardance of the film is subsequently measured at wavelength of about 1550 nm to be 0.41 waves. The birefringence at 1550 nm is thus calculated to be 0.047. Thus with this amount of stretch, this polymer is suitable for a half waveplate at 1550 nm with 16.3 μm thickness.

Example 20

A waveplate polymer is formulated 4 parts 6FDA, 3 parts PFMB, and 1 part C6BP, and the waveplate polymer is drawn uniaxially in the x direction at 230C to a draw ratio of 107% and a thickness of 14 micron. The refractive indices in the plane of the film parallel and perpendicular to the stretch direction are measured in a prism coupler manufactured by Metricon at wavelength 633 nm. In the stretch direction the refractive index is measured multiple times, giving average value 1.6153. In the direction perpendicular to the stretch direction the refractive index is again measured, giving average value 1.5579. From this the birefringence at 633 nm is calculated to be 0.057, indicating that the polymer has achieved high birefringence. The retardance of the film is subsequently measured at wavelength of about 1550 nm to be 0.47 waves. The birefringence at 1550 nm is thus calculated to be 0.054. Thus with this amount of stretch, this polymer is suitable for a half waveplate at 1550 nm with 14.4 μm thickness.

Example 21

A fifth waveplate polymer is formulated 9 parts bis-ADA, 1 part 6FDA, 8 parts PFMB, and 2 parts C6BP, and the waveplate polymer is drawn uniaxially in the x direction at 190C to a draw ratio of 50% and a thickness of 12 micron. The retardance of the film is subsequently measured at wavelength of about 1550 nm to be 0.5 waves. The birefringence at 1550 nm is thus calculated to be 0.065.

Example 22

Figure 10:
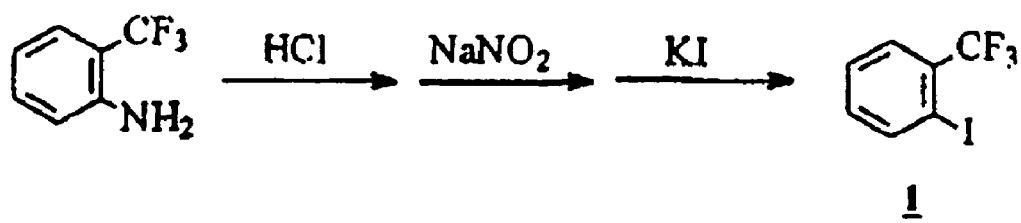
FIG. 10 depicts a set of reactions to form a monomer used in forming the polymer depicted in FIG. 6.
Figure 10:
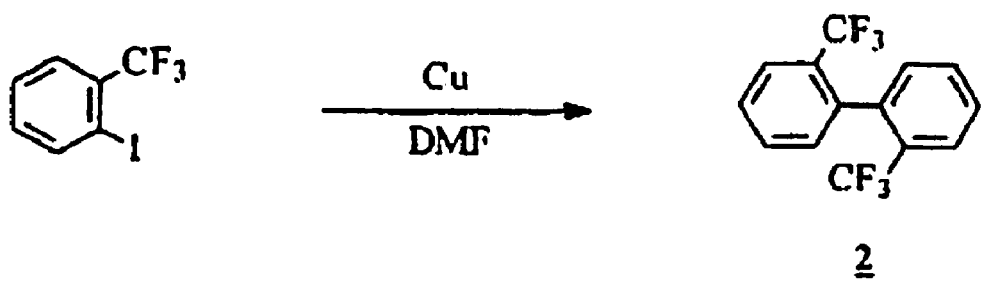
Figure 10:
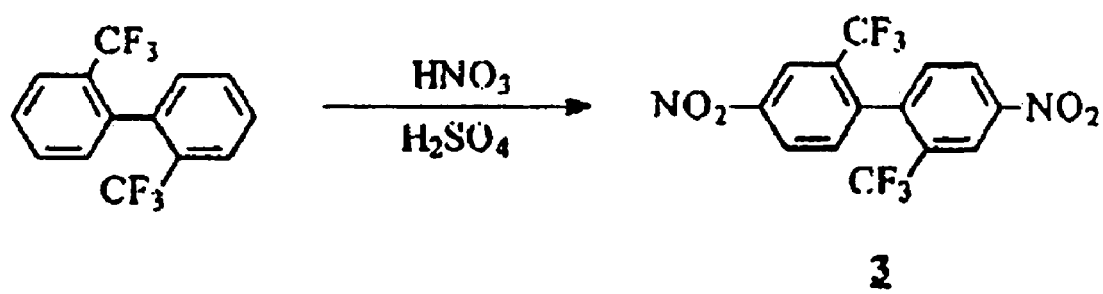
Figure 10:
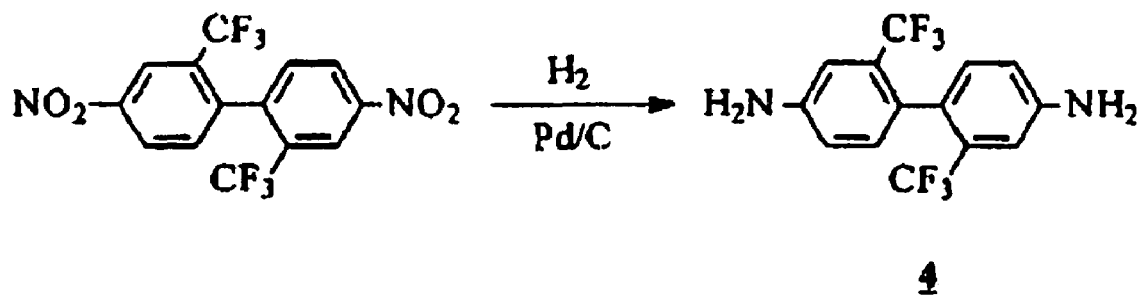

Preparation of PFMB (FIG. 10)

2-Iodotrifluoromethylbenzene (1)

A 4-L beaker, equipped with a mechanical stirrer, a thermometer and an addition funnel was charged with 560 ml of concentrated hydrochloric acid and 640 g of ice. After the mixture was stirred and cooled to 0° C., 250 ml of 2-trifluoromethylaniline (2.00 mol) was added slowly. After the addition was complete, the mixture was stirred for 10 minutes, and 141.0 g of sodium nitrite in 400 ml of cold water was adder dropwise so as to maintain the temperature below 0° C. The reaction mixture was stirred at 0° C. for an additional 30 minutes and then filtered. The filtrate, which was maintained at 0° C., was added dropwise to a 4-L beaker charged with 381.2 g of potassium iodide in 1000 ml of water cooled to 0° C. After the addition, the reaction mixture was stirred for an additional 30 minutes at 0° C. and then for one hour at room temperature. The mixture was placed in a separatory funnel, and the organic layer was separated. The water layer was extracted with methylene chloride. The organic phase was washed with an aqueous sodium bisulfite solution several times and then dried over anhydrous magnesium sulfate. The solution was filtered and the methylene chloride was removed under reduced pressure to afford 510.9 g (94%) of a pale orange oil.

2,2'-Bis(trifluoromethyl)biphenyl (2)

To a 2-L three-necked, round-bottom flask fitted with a mechanical stirrer and a condenser was added 507.5 g of 2-iodotrifluoromethylbenzene (1.86 mol), 282.0 g of copper powder and 400 ml of DMF. The reaction mixture was stirred and heated at reflux for 24 hours and filtered. The filtrate was distilled under reduced pressure to yield 211.8 g (78%) of a light yellow oil.

2,2'-Bis(trifluoromethyl)-4,4'-dinitrobiphenyl (3)

To a 2-L three-necked, round-bottom flask equipped with a mechanical stirrer, a thermometer and an addition funnel was added 210.0 g of 2,2'-bis(trifluoromethyl)biphenyl and 725.0 g of concentrated sulfuric acid. After the stirred mixture was cooled to room temperature, 140.0 g of 70% concentrated nitric acid was added dropwise. After the addition was complete, the reaction mixture was heated slowly to 140° C., and another 67 g of 70% concentrated nitric acid was added. The reaction mixture was stirred at room temperature overnight and poured into ice water. The solid that precipitated was collected by filtration and washed with water. The solid was recrystallized from acetone/ethanol to afford 199.1 g (72%) of light yellow crystals.

2,2'-Bis-(trifluoromethyl)4,4'-diaminobiphenyl (4, PFMB)

A hydrogenation bottle was charged with 40.0 g of 2,2'-bis(trifluoromethyl)-4,4'-dinitrobiphenyl, 0.6 g of 5% palladium on activated carbon and 200 ml of ethyl acetate. The bottle was secured on a Parr hydrogenation apparatus, flushed five times with hydrogen, and then pressurized with hydrogen to 56 psi. The pressure was maintained, and the vessel was agitated for several hours. After the reaction mixture was filtered and about 200 ml of hexanes were added. The crystals that formed were filtered to afford 30.2 g (90%) of product.

Figure 11:
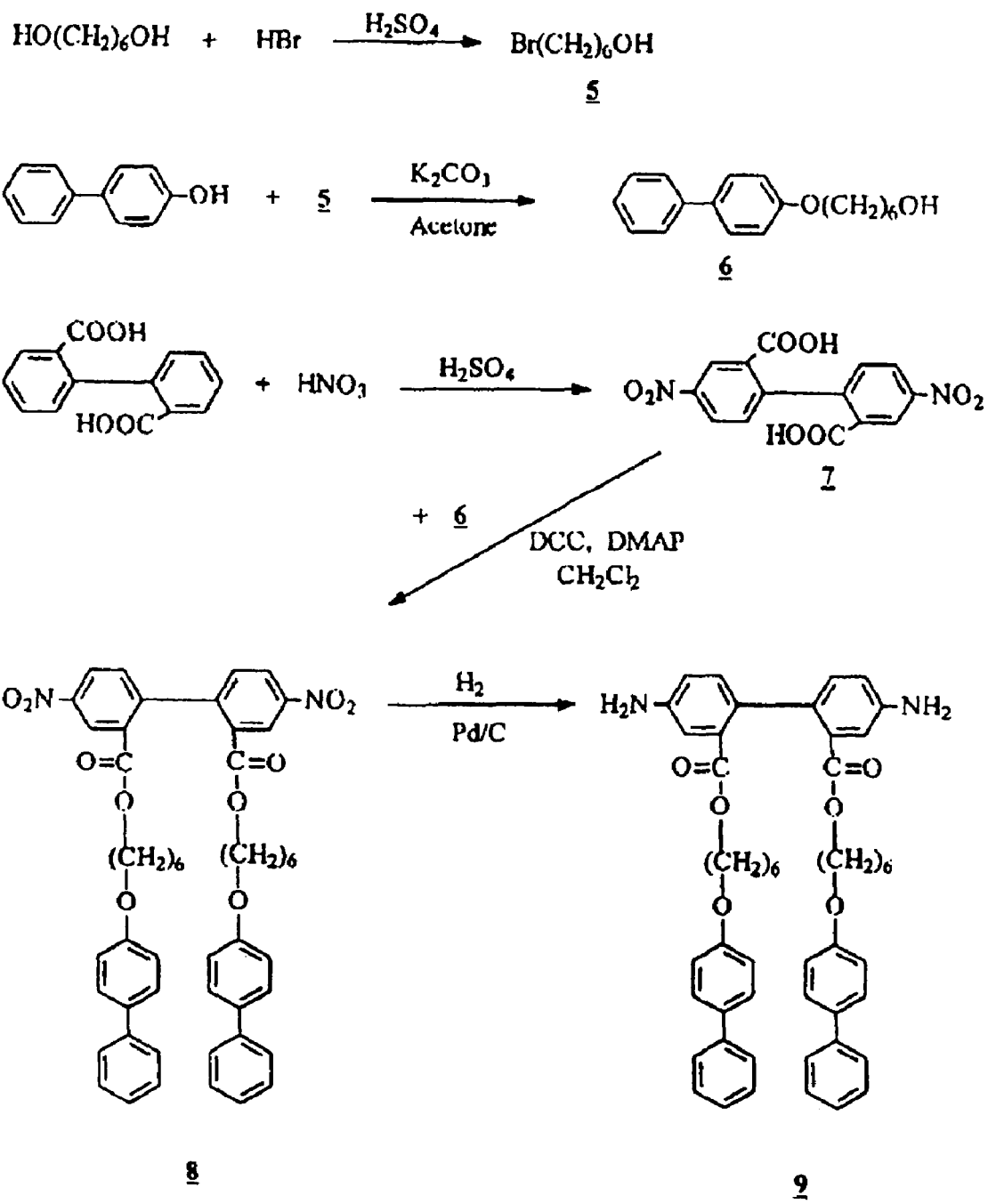
FIG. 11 depicts an additional set of reactions to form another monomer used in forming the polymer depicted in FIG. 7.

Preparation of C6BP (FIG. 11)

6-Bromo-1-hexanol (5)

A mixture of 1,6-hexanediol (454.4 g, 3.84 mol), hydrobromic acid (48% wt, 651.3 g, 3.86 mol), and concentrated sulfuric acid (220.0 g) was stirred at room temperature for two days and then heated at reflux for 3 hours. After the solution was allowed to cool to room temperature, the solution was extracted with methylene chloride three times. The extract was washed with water several times and dried over magnesium sulfate. The ethyl ether was removed on a rotary evaporator to give a brown liquid, which was chromatographed on a silica gel column with hexane as the eluent, and then with a mixture of ethyl acetate and hexane (1:1) as the eluent. The product fraction was collected and the solvents were removed under reduced pressure to afford 291.3 g (42%) of a light yellow clear liquid: $^1$H-NMR (CDCl3) δ (ppm): 1.31–1.97 (m, 8H), 3.38 (t, 2H), 3.61 (t, 2H).

4-(6-Hydroxyhexoxy)biphenyl (6)

To a 4 L three-necked round bottom flask fitted with a mechanical stirrer and a condenser were added 125.0 g of 4-hydroxybiphenyl (0.734 mol), 154.5 g of 6-bromo-1-hexanol (0.853 mol), 690 g of potassium carbonate, and 2500 ml of acetone. The reaction mixture was stirred and heated at reflux for 4 days and then filtered. The acetone was removed on a rotary evaporator, the residue was recrystallized from a mixture of ethyl acetate and hexanes to afford 188 g of white crystals (95%): mp 92–94° C.; 1H-NMR (CDCl$_3$) δ (ppm) 1.30–1.84 (m, 8H), 3.65 (t, 2H), 3.99 (t, 2H), 6.98 (d, 2H), 7.32–7.56 (m, 7H).

4,4'-Dinitrodiphenic acid (7)

To a 1000 ml, three-necked, round-bottom flask equipped with a mechanical stirrer, a thermometer and an addition funnel were added 30.0 g of diphenic acid (2,2'-diphenyldicarboxylic acid) (0.123 mol) and 469 g of concentrated sulfuric acid. After the diphenic acid dissolved to form a yellow solution, the mixture was cooled to −15° C. in a dry ice bath. In a separate Erlenmeyer flask, concentrated nitric acid (70% wt, 92.4 g, 1.03 mol) and concentrated sulfuric acid (12.0 g) were mixed and transferred to the addition funnel. The acid mixture was added slowly to the diphenic acid solution so that the mixture was maintained below 0° C. After the addition was complete, the reaction mixture was allowed to warm to room temperature and stirred for 24 hours. After the mixture was poured onto crushed ice, the precipitate that formed was collected by filtration and washed with water. The solid was dissolved in a 10% aqueous solution of sodium hydroxide, and the insoluble portion was removed by filtration. The filtrate was acidified with concentrated hydrochloric acid. The precipitate was collected and recrystallized first from a mixture of ethanol and water twice to give 36.5 g of light yellow crystals (89.5%); mp 255–258° C. (lit. mp 258–259° C.); 1H-NMR (DMSO-d6) δ (ppm) 7.53 (d, 2H), 8.44 (dd, 2H,) and 8.67 (d, 2H).

Bis{6-[4-biphenyloxy]hexyl} 4,4'-dinitro-2,2'-biphenyldicarboxylate (8)

To a 500 ml Erlenmeyer flask fitted with a magnetic stirring bar were added 9.8 g of 4,4'-dinitrodiphenic acid (7) (29.6 mmol), 17.0 g of 6-hydroxyhexoxybiphenyl (6) (62.8 mmol), 13.2 g of dicyclohexylcarbodiimide (64.2 mmol), 0.5 g of dimethylaminopyridine, and 400 ml of methylene chloride. The mixture was stirred at room temperature overnight and filtered. The filtrate was taken to dryness on a rotary evaporator to give an orange solid. The solid was recrystallized from ethyl acetate/hexanes to afford 16.5 g (67%) of light yellow crystals, mp: 121–122° C. $^1$H-NMR (d-CDCl$_3$) δ (ppm) 1.2–1.8 (m, 16H), 3.9 (t, 4H), 4.1 (t, 4H), 6.9 (d, 4H), 7.2–7.6 (m, 16H), 8.4 (dd, 2H) and 8.9 (d, 2H).

Bis{6-[4-biphenyloxy]hexyl} 4,4'-diamino-2,2'-biphenyldicarboxylate (9, C6BP)

Bis{6-[4-biphenyloxy]hexyl} 4,4'-dinitro-2,2'-biphenyldicarboxylate (8) (2.26 g, 2.70 mol), palladium on activated carbon (5%, 0.31 g), and tetrahydrofuran (50 ml) were added to a hydrogenation bottle. The bottle was secured on a Parr hydrogenation apparatus, flushed five times with hydrogen, then pressurized with hydrogen to 56 psi. The pressure was maintained and the vessel was agitated for 24 hours. After the reaction mixture was filtered and about 100 ml of hexanes were added to recrystallize the products directly to afford 1.7 g (80%) of light yellow crystals. mp: 122–124° C. $^1$H-NMR (CDCl$_3$) δ (ppm) 1.2–1.8 (m, 16H), 3.9 (m, 8H), 6.8–7.6 (m, 24H).

TABLE 1

Examples of backbones, mesogens, linkers, and optional spacers

| DESIGNATION | BACKBONE ("B") | "X" GROUP OF MESOGEN | "R" GROUP OF MESOGEN | LINKER ("L") | OPTIONAL SPACER ("S") |
|---|---|---|---|---|---|
| 1 | polycarbonate | (none) | hydrogen | ether | poly(alkylene oxide) |
| 2 | polyolefin | axo | alkyl | ester | polyalkane |
| 3 | polysulfone | diazo | cycloalkyl | amide | polyperfluoroalkane |
| 4 | polyphenylene | azoxy | aryl | imide | polysiloxane |
| 5 | polyimide | nitrone | aralkyl | urethane | aliphatic polyether |
| 6 | polyamideimide | carbon-carbon double bond | alkaryl | alkylene | |
| 7 | polyesterimide | carbon-carbon triple bond | cyano | alkyl | |
| 8 | polyetherimide | amide | alkoxy | | |
| 9 | polyketone | imide | acyloxy | | |
| 10 | polyetherketone | Schiff base | halogen | | |
| 11 | polybenzoxazole | ester | | | |
| 12 | polyoxa-diazole | | | | |
| 13 | polybenzothiazole | | | | |
| 14 | polythia-diazole | | | | |
| 15 | polyquin-oxaline | | | | |
| 16 | polybenzimidazole | | | | |
| 17 | polyacetal | | | | |
| 18 | polysulfone | | | | |
| 19 | polysulfide | | | | |
| 20 | polythioester | | | | |
| 21 | polysulfonamide | | | | |
| 22 | polyamide | | | | |
| 23 | polyurethane | | | | |
| 24 | polyurea | | | | |
| 25 | polyimine | | | | |
| 26 | polyphosphazene | | | | |
| 27 | polysilane | | | | |
| 28 | polysiloxane | | | | |
| 29 | polysilazane | | | | |
| 30 | polyether | | | | |
| 31 | polycarbonate | | | | |
| 32 | polyester | | | | |
| 33 | polyphenylene | | | | |
| 34 | polydiene | | | | |
| 35 | polyalkene | | | | |
| 36 | polyacrylate | | | | |
| 37 | polyvinyl ether | | | | |
| 38 | polyvinyl ketone | | | | |
| 39 | polyvinyl halide | | | | |
| 40 | polyvinyl nitrile | | | | |
| 41 | polyvinyl ester | | | | |
| 42 | polystyrene | | | | |
| 43 | polyarylether | | | | |
| 44 | polyarylene | | | | |

TABLE 2

Polymers used to form waveplates polyimide backbone with phenyl-phenyl mesogen
polyimide backbone with phenyl-phenyl-cyano mesogen
polyimide backbone with phenyl-phenyl-acyloxy mesogen
polyimide backbone with phenyl-phenyl-alkyl mesogen
polyimide backbone with phenyl-phenyl-aryl mesogen
polyimide backbone with phenyl-C double bond C-phenyl mesogen
polyimide backbone with phenyl-C double bond C-phenyl-cyano mesogen
polyimide backbone with phenyl-C double bond C-phenyl-acyloxy mesogen
polyimide backbone with phenyl-C double bond C-phenyl-alkyl mesogen
polyimide backbone with phenyl-C double bond C-phenyl-aryl mesogen
polyimide backbone with phenyl-C triple bond C-phenyl mesogen
polyimide backbone with phenyl-C triple bond C-phenyl-cyano mesogen
polyimide backbone with phenyl-C triple bond C-phenyl-acyloxy mesogen
polyimide backbone with phenyl-C triple bond C-phenyl-alkyl mesogen
polyimide backbone with phenyl-C triple bond C-phenyl-aryl mesogen
polyimide backbone with phenyl-ester-phenyl mesogen
polyimide backbone with phenyl-ester-phenyl-cyano mesogen
polyimide backbone with phenyl-ester-phenyl-acyloxy mesogen
polyimide backbone with phenyl-ester-phenyl-alkyl mesogen
polyimide backbone with phenyl-ester-phenyl-aryl mesogen
polyimide backbone with phenyl-amide-phenyl mesogen
polyimide backbone with phenyl-amide-phenyl-cyano mesogen
polyimide backbone with phenyl-amide-phenyl-acyloxy mesogen
polyimide backbone with phenyl-amide-phenyl-alkyl mesogen
polyimide backbone with phenyl-amide-phenyl-aryl mesogen
polyimide backbone with phenyl-azo-phenyl mesogen
polyimide backbone with phenyl-azo-phenyl-cyano mesogen
polyimide backbone with phenyl-azo-phenyl-acyloxy mesogen
polyimide backbone with phenyl-azo-phenyl-alkyl mesogen
polyimide backbone with phenyl-azo-phenyl-aryl mesogen
polyetherimide backbone with phenyl-phenyl mesogen
polyetherimide backbone with phenyl-phenyl-cyano mesogen TABLE 2-continued Polymers used to form waveplates polyetherimide backbone with phenyl-phenyl-acyloxy mesogen
polyetherimide backbone with phenyl-phenyl-alkyl mesogen
polyetherimide backbone with phenyl-phenyl-aryl mesogen
polyetherimide backbone with phenyl-C double bond C-phenyl mesogen
polyetherimide backbone with phenyl-C double bond C-phenyl-cyano mesogen
polyetherimide backbone with phenyl-C double bond C-phenyl-acyloxy mesogen
polyetherimide backbone with phenyl-C double bond C-phenyl-alkyl mesogen
polyetherimide backbone with phenyl-C double bond C-phenyl-aryl mesogen
polyetherimide backbone with phenyl-C triple bond C-phenyl mesogen
polyetherimide backbone with phenyl-C triple bond C-phenyl-cyano mesogen
polyetherimide backbone with phenyl-C triple bond C-phenyl-acyloxy mesogen
polyetherimide backbone with phenyl-C triple bond C-phenyl-alkyl mesogen
polyetherimide backbone with phenyl-C triple bond C-phenyl-aryl mesogen
polyetherimide backbone with phenyl-ester-phenyl mesogen
polyetherimide backbone with phenyl-ester-phenyl-cyano mesogen
polyetherimide backbone with phenyl-ester-phenyl-acyloxy mesogen
polyetherimide backbone with phenyl-ester-phenyl-alkyl mesogen
polyetherimide backbone with phenyl-ester-phenyl-aryl mesogen
polyetherimide backbone with phenyl-amide-phenyl mesogen
polyetherimide backbone with phenyl-amide-phenyl-cyano mesogen
polyetherimide backbone with phenyl-amide-phenyl-acyloxy mesogen
polyetherimide backbone with phenyl-amide-phenyl-alkyl mesogen
polyetherimide backbone with phenyl-amide-phenyl-aryl mesogen
polyetherimide backbone with phenyl-azo-phenyl mesogen
polyetherimide backbone with phenyl-azo-phenyl-cyano mesogen
polyetherimide backbone with phenyl-azo-phenyl-acyloxy mesogen
polyetherimide backbone with phenyl-azo-phenyl-alkyl mesogen
polyetherimide backbone with phenyl-azo-phenyl-aryl mesogen
polyesterimide backbone with phenyl-phenyl mesogen
polyesterimide backbone with phenyl-phenyl-cyano mesogen
polyesterimide backbone with phenyl-phenyl-acyloxy mesogen
polyesterimide backbone with phenyl-phenyl-alkyl mesogen
polyesterimide backbone with phenyl-phenyl-aryl mesogen
polyesterimide backbone with phenyl-C double bond C-phenyl mesogen
polyesterimide backbone with phenyl-C double bond C-phenyl-cyano mesogen
polyesterimide backbone with phenyl-C double bond C-phenyl-acyloxy mesogen
polyesterimide backbone with phenyl-C double bond C-phenyl-alkyl mesogen
polyesterimide backbone with phenyl-C double bond C-phenyl-aryl mesogen
polyesterimide backbone with phenyl-C triple bond C-phenyl mesogen
polyesterimide backbone with phenyl-C triple bond C-phenyl-cyano mesogen
polyesterimide backbone with phenyl-C triple bond C-phenyl-acyloxy mesogen
polyesterimide backbone with phenyl-C triple bond C-phenyl-alkyl mesogen
polyesterimide backbone with phenyl-C triple bond C-phenyl-aryl mesogen
polyesterimide backbone with phenyl-ester-phenyl mesogen
polyesterimide backbone with phenyl-ester-phenyl-cyano mesogen
polyesterimide backbone with phenyl-ester-phenyl-acyloxy mesogen
polyesterimide backbone with phenyl-ester-phenyl-alkyl mesogen
polyesterimide backbone with phenyl-ester-phenyl-aryl mesogen
polyesterimide backbone with phenyl-amide-phenyl mesogen
polyesterimide backbone with phenyl-amide-phenyl-cyano mesogen
polyesterimide backbone with phenyl-amide-phenyl-acyloxy mesogen
polyesterimide backbone with phenyl-amide-phenyl-alkyl mesogen
polyesterimide backbone with phenyl-amide-phenyl-aryl mesogen
polyesterimide backbone with phenyl-azo-phenyl mesogen
polyesterimide backbone with phenyl-azo-phenyl-cyano mesogen
polyesterimide backbone with phenyl-azo-phenyl-acyloxy mesogen
polyesterimide backbone with phenyl-azo-phenyl-alkyl mesogen
polyesterimide backbone with phenyl-azo-phenyl-aryl mesogen
polyamideimide backbone with phenyl-phenyl mesogen
polyamideimide backbone with phenyl-phenyl-cyano mesogen
polyamideimide backbone with phenyl-phenyl-acyloxy mesogen
polyamideimide backbone with phenyl-phenyl-alkyl mesogen
polyamideimide backbone with phenyl-phenyl-aryl mesogen
polyamideimide backbone with phenyl-C double bond C-phenyl mesogen
polyamideimide backbone with phenyl-C double bond C-phenyl-cyano mesogen
polyamideimide backbone with phenyl-C double bond C-phenyl-acyloxy mesogen
polyamideimide backbone with phenyl-C double bond C-phenyl-alkyl mesogen
polyamideimide backbone with phenyl-C double bond C-phenyl-aryl mesogen
polyamideimide backbone with phenyl-C triple bond C-phenyl mesogen
polyamideimide backbone with phenyl-C triple bond C-phenyl-cyano mesogen
polyamideimide backbone with phenyl-C triple bond C-phenyl-acyloxy mesogen
polyamideimide backbone with phenyl-C triple bond C-phenyl-alkyl mesogen
polyamideimide backbone with phenyl-C triple bond C-phenyl-aryl mesogen
polyamideimide backbone with phenyl-ester-phenyl mesogen
polyamideimide backbone with phenyl-ester-phenyl-cyano mesogen
polyamideimide backbone with phenyl-ester-phenyl-acyloxy mesogen
polyamideimide backbone with phenyl-ester-phenyl-alkyl mesogen
polyamideimide backbone with phenyl-ester-phenyl-aryl mesogen
polyamideimide backbone with phenyl-amide-phenyl mesogen
polyamideimide backbone with phenyl-amide-phenyl-cyano mesogen
polyamideimide backbone with phenyl-amide-phenyl-acyloxy mesogen
polyamideimide backbone with phenyl-amide-phenyl-alkyl mesogen
polyamideimide backbone with phenyl-amide-phenyl-aryl mesogen
polyamideimide backbone with phenyl-azo-phenyl mesogen
polyamideimide backbone with phenyl-azo-phenyl-cyano mesogen
polyamideimide backbone with phenyl-azo-phenyl-acyloxy mesogen
polyamideimide backbone with phenyl-azo-phenyl-alkyl mesogen
polyamideimide backbone with phenyl-azo-phenyl-aryl mesogen
polyketone backbone with phenyl-phenyl mesogen
polyketone backbone with phenyl-phenyl-cyano mesogen
polyketone backbone with phenyl-phenyl-acyloxy mesogen
polyketone backbone with phenyl-phenyl-alkyl mesogen
polyketone backbone with phenyl-phenyl-aryl mesogen
polyketone backbone with phenyl-C double bond C-phenyl mesogen
polyketone backbone with phenyl-C double bond C-phenyl-cyano mesogen
polyketone backbone with phenyl-C double bond C-phenyl-acyloxy mesogen
polyketone backbone with phenyl-C double bond C-phenyl-alkyl mesogen
polyketone backbone with phenyl-C double bond C-phenyl-aryl mesogen
polyketone backbone with phenyl-C triple bond C-phenyl mesogen
polyketone backbone with phenyl-C triple bond C-phenyl-cyano mesogen
polyketone backbone with phenyl-C triple bond C-phenyl-acyloxy mesogen
polyketone backbone with phenyl-C triple bond C-phenyl-alkyl mesogen
polyketone backbone with phenyl-C triple bond C-phenyl-aryl mesogen
polyketone backbone with phenyl-ester-phenyl mesogen
polyketone backbone with phenyl-ester-phenyl-cyano mesogen
polyketone backbone with phenyl-ester-phenyl-acyloxy mesogen
polyketone backbone with phenyl-ester-phenyl-alkyl mesogen
polyketone backbone with phenyl-ester-phenyl-aryl mesogen
polyketone backbone with phenyl-amide-phenyl mesogen
polyketone backbone with phenyl-amide-phenyl-cyano mesogen
polyketone backbone with phenyl-amide-phenyl-acyloxy mesogen
polyketone backbone with phenyl-amide-phenyl-alkyl mesogen
polyketone backbone with phenyl-amide-phenyl-aryl mesogen
polyketone backbone with phenyl-azo-phenyl mesogen
polyketone backbone with phenyl-azo-phenyl-cyano mesogen
polyketone backbone with phenyl-azo-phenyl-acyloxy mesogen
polyketone backbone with phenyl-azo-phenyl-alkyl mesogen
polyketone backbone with phenyl-azo-phenyl-aryl mesogen

TABLE 2-continued

Polymers used to form waveplates polyarylethers backbone with phenyl-phenyl mesogen
polyarylethers backbone with phenyl-phenyl-cyano mesogen
polyarylethers backbone with phenyl-phenyl-acyloxy mesogen
polyarylethers backbone with phenyl-phenyl-alkyl mesogen
polyarylethers backbone with phenyl-phenyl-aryl mesogen
polyarylethers backbone with phenyl-C double bond C-phenyl mesogen
polyarylethers backbone with phenyl-C double bond C-phenyl-cyano mesogen
polyarylethers backbone with phenyl-C double bond C-phenyl-acyloxy mesogen
polyarylethers backbone with phenyl-C double bond C-phenyl-alkyl mesogen
polyarylethers backbone with phenyl-C double bond C-phenyl-aryl mesogen
polyarylethers backbone with phenyl-C triple bond C-phenyl mesogen
polyarylethers backbone with phenyl-C triple bond C-phenyl-cyano mesogen
polyarylethers backbone with phenyl-C triple bond C-phenyl-acyloxy mesogen
polyarylethers backbone with phenyl-C triple bond C-phenyl-alkyl mesogen
polyarylethers backbone with phenyl-C triple bond C-phenyl-aryl mesogen
polyarylethers backbone with phenyl-ester-phenyl mesogen
polyarylethers backbone with phenyl-ester-phenyl-cyano mesogen
polyarylethers backbone with phenyl-ester-phenyl-acyloxy mesogen
polyarylethers backbone with phenyl-ester-phenyl-alkyl mesogen
polyarylethers backbone with phenyl-ester-phenyl-aryl mesogen
polyarylethers backbone with phenyl-amide-phenyl mesogen
polyarylethers backbone with phenyl-amide-phenyl-cyano mesogen
polyarylethers backbone with phenyl-amide-phenyl-acyloxy mesogen
polyarylethers backbone with phenyl-amide-phenyl-alkyl mesogen
polyarylethers backbone with phenyl-amide-phenyl-aryl mesogen
polyarylethers backbone with phenyl-azo-phenyl mesogen
polyarylethers backbone with phenyl-azo-phenyl-cyano mesogen
polyarylethers backbone with phenyl-azo-phenyl-acyloxy mesogen
polyarylethers backbone with phenyl-azo-phenyl-alkyl mesogen
polyarylethers backbone with phenyl-azo-phenyl-aryl mesogen
polyetherketone backbone with phenyl-phenyl mesogen
polyetherketone backbone with phenyl-phenyl-cyano mesogen
polyetherketone backbone with phenyl-phenyl-acyloxy mesogen
polyetherketone backbone with phenyl-phenyl-alkyl mesogen
polyetherketone backbone with phenyl-phenyl-aryl mesogen
polyetherketone backbone with phenyl-C double bond C-phenyl mesogen
polyetherketone backbone with phenyl-C double bond C-phenyl-cyano mesogen
polyetherketone backbone with phenyl-C double bond C-phenyl-acyloxy mesogen
polyetherketone backbone with phenyl-C double bond C-phenyl-alkyl mesogen
polyetherketone backbone with phenyl-C double bond C-phenyl-aryl mesogen
polyetherketone backbone with phenyl-C triple bond C-phenyl mesogen
polyetherketone backbone with phenyl-C triple bond C-phenyl-cyano mesogen
polyetherketone backbone with phenyl-C triple bond C-phenyl-acyloxy mesogen
polyetherketone backbone with phenyl-C triple bond C-phenyl-alkyl mesogen
polyetherketone backbone with phenyl-C triple bond C-phenyl-aryl mesogen
polyetherketone backbone with phenyl-ester-phenyl mesogen
polyetherketone backbone with phenyl-ester-phenyl-cyano mesogen
polyetherketone backbone with phenyl-ester-phenyl-acyloxy mesogen
polyetherketone backbone with phenyl-ester-phenyl-alkyl mesogen
polyetherketone backbone with phenyl-ester-phenyl-aryl mesogen
polyetherketone backbone with phenyl-amide-phenyl mesogen
polyetherketone backbone with phenyl-amide-phenyl-cyano mesogen
polyetherketone backbone with phenyl-amide-phenyl-acyloxy mesogen
polyetherketone backbone with phenyl-amide-phenyl-alkyl mesogen
polyetherketone backbone with phenyl-amide-phenyl-aryl mesogen
polyetherketone backbone with phenyl-azo-phenyl mesogen
polyetherketone backbone with phenyl-azo-phenyl-cyano mesogen
polyetherketone backbone with phenyl-azo-phenyl-acyloxy mesogen
polyetherketone backbone with phenyl-azo-phenyl-alkyl mesogen
polyetherketone backbone with phenyl-azo-phenyl-aryl mesogen
polysulfone backbone with phenyl-phenyl mesogen
polysulfone backbone with phenyl-phenyl-cyano mesogen
polysulfone backbone with phenyl-phenyl-acyloxy mesogen
polysulfone backbone with phenyl-phenyl-alkyl mesogen
polysulfone backbone with phenyl-phenyl-aryl mesogen
polysulfone backbone with phenyl-C double bond C-phenyl mesogen
polysulfone backbone with phenyl-C double bond C-phenyl-cyano mesogen
polysulfone backbone with phenyl-C double bond C-phenyl-acyloxy mesogen
polysulfone backbone with phenyl-C double bond C-phenyl-alkyl mesogen
polysulfone backbone with phenyl-C double bond C-phenyl-aryl mesogen
polysulfone backbone with phenyl-C triple bond C-phenyl mesogen
polysulfone backbone with phenyl-C triple bond C-phenyl-cyano mesogen
polysulfone backbone with phenyl-C triple bond C-phenyl-acyloxy mesogen
polysulfone backbone with phenyl-C triple bond C-phenyl-alkyl mesogen
polysulfone backbone with phenyl-C triple bond C-phenyl-aryl mesogen
polysulfone backbone with phenyl-ester-phenyl mesogen
polysulfone backbone with phenyl-ester-phenyl-cyano mesogen
polysulfone backbone with phenyl-ester-phenyl-acyloxy mesogen
polysulfone backbone with phenyl-ester-phenyl-alkyl mesogen
polysulfone backbone with phenyl-ester-phenyl-aryl mesogen
polysulfone backbone with phenyl-amide-phenyl mesogen
polysulfone backbone with phenyl-amide-phenyl-cyano mesogen
polysulfone backbone with phenyl-amide-phenyl-acyloxy mesogen
polysulfone backbone with phenyl-amide-phenyl-alkyl mesogen
polysulfone backbone with phenyl-amide-phenyl-aryl mesogen
polysulfone backbone with phenyl-azo-phenyl mesogen
polysulfone backbone with phenyl-azo-phenyl-cyano mesogen
polysulfone backbone with phenyl-azo-phenyl-acyloxy mesogen
polysulfone backbone with phenyl-azo-phenyl-alkyl mesogen
polysulfone backbone with phenyl-azo-phenyl-aryl mesogen
aromatic polysulfide backbone with phenyl-phenyl mesogen
aromatic polysulfide backbone with phenyl-phenyl-cyano mesogen
aromatic polysulfide backbone with phenyl-phenyl-acyloxy mesogen
aromatic polysulfide backbone with phenyl-phenyl-alkyl mesogen
aromatic polysulfide backbone with phenyl-phenyl-aryl mesogen
aromatic polysulfide backbone with phenyl-C double bond C-phenyl mesogen
aromatic polysulfide backbone with phenyl-C double bond C-phenyl-cyano mesogen
aromatic polysulfide backbone with phenyl-C double bond C-phenyl-acyloxy mesogen
aromatic polysulfide backbone with phenyl-C double bond C-phenyl-alkyl mesogen
aromatic polysulfide backbone with phenyl-C double bond C-phenyl-aryl mesogen
aromatic polysulfide backbone with phenyl-C triple bond C-phenyl mesogen
aromatic polysulfide backbone with phenyl-C triple bond C-phenyl-cyano mesogen
aromatic polysulfide backbone with phenyl-C triple bond C-phenyl-acyloxy mesogen
aromatic polysulfide backbone with phenyl-C triple bond C-phenyl-alkyl mesogen
aromatic polysulfide backbone with phenyl-C triple bond C-phenyl-aryl mesogen
aromatic polysulfide backbone with phenyl-ester-phenyl mesogen
aromatic polysulfide backbone with phenyl-ester-phenyl-cyano mesogen
aromatic polysulfide backbone with phenyl-ester-phenyl-acyloxy mesogen
aromatic polysulfide backbone with phenyl-ester-phenyl-alkyl mesogen
aromatic polysulfide backbone with phenyl-ester-phenyl-aryl mesogen
aromatic polysulfide backbone with phenyl-amide-phenyl mesogen TABLE 2-continued Polymers used to form waveplates aromatic polysulfide backbone with phenyl-amide-phenyl-cyano mesogen
aromatic polysulfide backbone with phenyl-amide-phenyl-acyloxy mesogen
aromatic polysulfide backbone with phenyl-amide-phenyl-alkyl mesogen
aromatic polysulfide backbone with phenyl-amide-phenyl-aryl mesogen
aromatic polysulfide backbone with phenyl-azo-phenyl mesogen
aromatic polysulfide backbone with phenyl-azo-phenyl-cyano mesogen
aromatic polysulfide backbone with phenyl-azo-phenyl-acyloxy mesogen
aromatic polysulfide backbone with phenyl-azo-phenyl-alkyl mesogen
aromatic polysulfide backbone with phenyl-azo-phenyl-aryl mesogen
polyarylene backbone with phenyl-phenyl mesogen
polyarylene backbone with phenyl-phenyl-cyano mesogen
polyarylene backbone with phenyl-phenyl-acyloxy mesogen
polyarylene backbone with phenyl-phenyl-alkyl mesogen
polyarylene backbone with phenyl-phenyl-aryl mesogen
polyarylene backbone with phenyl-C double bond C-phenyl mesogen
polyarylene backbone with phenyl-C double bond C-phenyl-cyano mesogen
polyarylene backbone with phenyl-C double bond C-phenyl-acyloxy mesogen
polyarylene backbone with phenyl-C double bond C-phenyl-alkyl mesogen
polyarylene backbone with phenyl-C double bond C-phenyl-aryl mesogen
polyarylene backbone with phenyl-C triple bond C-phenyl mesogen
polyarylene backbone with phenyl-C triple bond C-phenyl-cyano mesogen
polyarylene backbone with phenyl-C triple bond C-phenyl-acyloxy mesogen
polyarylene backbone with phenyl-C triple bond C-phenyl-alkyl mesogen
polyarylene backbone with phenyl-C triple bond C-phenyl-aryl mesogen
polyarylene backbone with phenyl-ester-phenyl mesogen
polyarylene backbone with phenyl-ester-phenyl-cyano mesogen
polyarylene backbone with phenyl-ester-phenyl-acyloxy mesogen
polyarylene backbone with phenyl-ester-phenyl-alkyl mesogen
polyarylene backbone with phenyl-ester-phenyl-aryl mesogen
polyarylene backbone with phenyl-amide-phenyl mesogen
polyarylene backbone with phenyl-amide-phenyl-cyano mesogen
polyarylene backbone with phenyl-amide-phenyl-acyloxy mesogen
polyarylene backbone with phenyl-amide-phenyl-alkyl mesogen
polyarylene backbone with phenyl-amide-phenyl-aryl mesogen
polyarylene backbone with phenyl-azo-phenyl mesogen
polyarylene backbone with phenyl-azo-phenyl-cyano mesogen
polyarylene backbone with phenyl-azo-phenyl-acyloxy mesogen
polyarylene backbone with phenyl-azo-phenyl-alkyl mesogen
polyarylene backbone with phenyl-azo-phenyl-aryl mesogen
aromatic polyester backbone with phenyl-phenyl mesogen
aromatic polyester backbone with phenyl-phenyl-cyano mesogen
aromatic polyester backbone with phenyl-phenyl-acyloxy mesogen
aromatic polyester backbone with phenyl-phenyl-alkyl mesogen
aromatic polyester backbone with phenyl-phenyl-aryl mesogen
aromatic polyester backbone with phenyl-C double bond C-phenyl mesogen
aromatic polyester backbone with phenyl-C double bond C-phenyl-cyano mesogen
aromatic polyester backbone with phenyl-C double bond C-phenyl-acyloxy mesogen
aromatic polyester backbone with phenyl-C double bond C-phenyl-alkyl mesogen
aromatic polyester backbone with phenyl-C double bond C-phenyl-aryl mesogen
aromatic polyester backbone with phenyl-C triple bond C-phenyl mesogen
aromatic polyester backbone with phenyl-C triple bond C-phenyl-cyano mesogen
aromatic polyester backbone with phenyl-C triple bond C-phenyl-acyloxy mesogen
aromatic polyester backbone with phenyl-C triple bond C-phenyl-alkyl mesogen
aromatic polyester backbone with phenyl-C triple bond C-phenyl-aryl mesogen
aromatic polyester backbone with phenyl-ester-phenyl mesogen
aromatic polyester backbone with phenyl-ester-phenyl-cyano mesogen
aromatic polyester backbone with phenyl-ester-phenyl-acyloxy mesogen
aromatic polyester backbone with phenyl-ester-phenyl-alkyl mesogen
aromatic polyester backbone with phenyl-ester-phenyl-aryl mesogen
aromatic polyester backbone with phenyl-amide-phenyl mesogen
aromatic polyester backbone with phenyl-amide-phenyl-cyano mesogen
aromatic polyester backbone with phenyl-amide-phenyl-acyloxy mesogen
aromatic polyester backbone with phenyl-amide-phenyl-alkyl mesogen
aromatic polyester backbone with phenyl-amide-phenyl-aryl mesogen
aromatic polyester backbone with phenyl-azo-phenyl mesogen
aromatic polyester backbone with phenyl-azo-phenyl-cyano mesogen
aromatic polyester backbone with phenyl-azo-phenyl-acyloxy mesogen
aromatic polyester backbone with phenyl-azo-phenyl-alkyl mesogen
aromatic polyester backbone with phenyl-azo-phenyl-aryl mesogen
aromatic polyamide backbone with phenyl-phenyl mesogen
aromatic polyamide backbone with phenyl-phenyl-cyano mesogen
aromatic polyamide backbone with phenyl-phenyl-acyloxy mesogen
aromatic polyamide backbone with phenyl-phenyl-alkyl mesogen
aromatic polyamide backbone with phenyl-phenyl-aryl mesogen
aromatic polyamide backbone with phenyl-C double bond C-phenyl mesogen
aromatic polyamide backbone with phenyl-C double bond C-phenyl-cyano mesogen
aromatic polyamide backbone with phenyl-C double bond C-phenyl-acyloxy mesogen
aromatic polyamide backbone with phenyl-C double bond C-phenyl-alkyl mesogen
aromatic polyamide backbone with phenyl-C double bond C-phenyl-aryl mesogen
aromatic polyamide backbone with phenyl-C triple bond C-phenyl mesogen
aromatic polyamide backbone with phenyl-C triple bond C-phenyl-cyano mesogen
aromatic polyamide backbone with phenyl-C triple bond C-phenyl-acyloxy mesogen
aromatic polyamide backbone with phenyl-C triple bond C-phenyl-alkyl mesogen
aromatic polyamide backbone with phenyl-C triple bond C-phenyl-aryl mesogen
aromatic polyamide backbone with phenyl-ester-phenyl mesogen
aromatic polyamide backbone with phenyl-ester-phenyl-cyano mesogen
aromatic polyamide backbone with phenyl-ester-phenyl-acyloxy mesogen
aromatic polyamide backbone with phenyl-ester-phenyl-alkyl mesogen
aromatic polyamide backbone with phenyl-ester-phenyl-aryl mesogen
aromatic polyamide backbone with phenyl-amide-phenyl mesogen
aromatic polyamide backbone with phenyl-amide-phenyl-cyano mesogen
aromatic polyamide backbone with phenyl-amide-phenyl-acyloxy mesogen
aromatic polyamide backbone with phenyl-amide-phenyl-alkyl mesogen
aromatic polyamide backbone with phenyl-amide-phenyl-aryl mesogen
aromatic polyamide backbone with phenyl-azo-phenyl mesogen
aromatic polyamide backbone with phenyl-azo-phenyl-cyano mesogen
aromatic polyamide backbone with phenyl-azo-phenyl-acyloxy mesogen
aromatic polyamide backbone with phenyl-azo-phenyl-alkyl mesogen
aromatic polyamide backbone with phenyl-azo-phenyl-aryl mesogen
aromatic polycarbonate backbone with phenyl-phenyl mesogen
aromatic polycarbonate backbone with phenyl-phenyl-cyano mesogen
aromatic polycarbonate backbone with phenyl-phenyl-acyloxy mesogen
aromatic polycarbonate backbone with phenyl-phenyl-alkyl mesogen
aromatic polycarbonate backbone with phenyl-phenyl-aryl mesogen
aromatic polycarbonate backbone with phenyl-C double bond C-phenyl mesogen TABLE 2-continued Polymers used to form waveplates aromatic polycarbonate backbone with phenyl-C double bond C-phenyl-cyano mesogen
aromatic polycarbonate backbone with phenyl-C double bond C-phenyl-acyloxy mesogen
aromatic polycarbonate backbone with phenyl-C double bond C-phenyl-alkyl mesogen
aromatic polycarbonate backbone with phenyl-C double bond C-phenyl-aryl mesogen
aromatic polycarbonate backbone with phenyl-C triple bond C-phenyl mesogen
aromatic polycarbonate backbone with phenyl-C triple bond C-phenyl-cyano mesogen
aromatic polycarbonate backbone with phenyl-C triple bond C-phenyl-acyloxy mesogen
aromatic polycarbonate backbone with phenyl-C triple bond C-phenyl-alkyl mesogen
aromatic polycarbonate backbone with phenyl-C triple bond C-phenyl-aryl mesogen
aromatic polycarbonate backbone with phenyl-ester-phenyl mesogen
aromatic polycarbonate backbone with phenyl-ester-phenyl-cyano mesogen
aromatic polycarbonate backbone with phenyl-ester-phenyl-acyloxy mesogen
aromatic polycarbonate backbone with phenyl-ester-phenyl-alkyl mesogen
aromatic polycarbonate backbone with phenyl-ester-phenyl-aryl mesogen
aromatic polycarbonate backbone with phenyl-amide-phenyl mesogen
aromatic polycarbonate backbone with phenyl-amide-phenyl-cyano mesogen
aromatic polycarbonate backbone with phenyl-amide-phenyl-acyloxy mesogen
aromatic polycarbonate backbone with phenyl-amide-phenyl-alkyl mesogen
aromatic polycarbonate backbone with phenyl-amide-phenyl-aryl mesogen
aromatic polycarbonate backbone with phenyl-azo-phenyl mesogen
aromatic polycarbonate backbone with phenyl-azo-phenyl-cyano mesogen
aromatic polycarbonate backbone with phenyl-azo-phenyl-acyloxy mesogen
aromatic polycarbonate backbone with phenyl-azo-phenyl-alkyl mesogen
aromatic polycarbonate backbone with phenyl-azo-phenyl-aryl mesogen

What is claimed is:

1. A method of making an optical device comprising
(a) providing a mesogen-containing polymer film; and
(b) forming, from the film, a mesogen-containing polymer piece to have a length, a width, and a thickness adapted for use in a planar lightwave circuit, the mesogen-containing polymer piece having a birefringence not equal to zero, said birefringence being suitable for use in a waveguide of the planar lightwave circuit; and (c) inserting the polymer piece into an optical pathway of a waveguide of the planar lightwave circuit.

2. A method according to claim 1 wherein the mesogen-containing polymer film has a polymer backbone selected from the group consisting of polyimides, polyetherimides, polyesterimides, polyamideimides, polyketones, polyarylethers, polyetherketones, polysulfones, polysulfides, polyarylenes, polyesters, polyamides, polycarbonates, polyolefins, polyvinylesters, polyurethanes, polyacrylates, polyphenylenes.

3. A method according to claim 2 wherein the mesogen-containing polymer film contains at least one mesogen having the form phenyl-X-phenyl-R or phenyl-phenyl-R, where X is selected from the group consisting of azo, diazo, azoxy, nitrone, carbon-carbon double bond, carbon-carbon triple bond, amide, imide, Schiff base, and ester; and R is selected from the group consisting of poly(alkylene oxide), polyalkane, polyperfluoroalkane, polysiloxane, and aliphatic polyether.

4. A method according to claim 3 wherein the mesogen-containing polymer film has at least one linking group selected from the group consisting of ether, ester, amide, imide, urethane, alkylene, alkyl.

5. A method according to claim 4 wherein the mesogen-containing polymer film has at least one spacer group selected from the group consisting of poly(alkylene oxide), polyalkane, polyperfluoroalkane, polysiloxane, and aliphatic polyether.

6. A method according to claim 3 wherein the mesogen-containing polymer film has at least one spacer group selected from the group consisting of poly(alkylene oxide), polyalkane, polyperfluoroalkane, polysiloxane, and aliphatic polyether.

7. A method according to claim 2 wherein the mesogen groups are selected from the group consisting of trans 1,3 cyclohexane; trans 1,4 cyclohexane; trans 2,5 disubstituted 1,3 dioxane; trans 2,5 disubstituted 1,3 dithiane; and trans 2,5 disubstituted 1,3 dioxathiane.

8. A method according to claim 7 wherein the mesogen-containing polymer film has at least one linking group selected from the group consisting of ether, ester, amide, imide, urethane, alkylene, alkyl.

9. A method according to claim 8 wherein the mesogen-containing polymer film has at least one spacer group selected from the group consisting of poly(alkylene oxide), polyalkane, polyperfluoroalkane, polysiloxane, and aliphatic polyether.

10. A method according to claim 7 wherein the mesogen-containing polymer film has at least one spacer group selected from the group consisting of poly(alkylene oxide), polyalkane, polyperfluoroalkane, polysiloxane, and aliphatic polyether.

11. A method according to claim 2 wherein the mesogen-containing polymer film has at least one linking group selected from the group consisting of ether, ester, amide, imide, urethane, alkylene, alkyl.

12. A method according to claim 11 wherein the mesogen-containing polymer film has at least one spacer group selected from the group consisting of poly(alkylene oxide), polyalkane, polyperfluoroalkane, polysiloxane, and aliphatic polyether.

13. A method according to claim 2 wherein the mesogen-containing polymer film has at least one spacer group selected from the group consisting of poly(alkylene oxide), polyalkane, polyperfluoroalkane, polysiloxane, and aliphatic polyether.

14. A method according to claim 1 wherein the mesogen-containing polymer film contains at least one mesogen having the form phenyl-X-phenyl-R or phenyl-phenyl-R, where X is selected from the group consisting of azo, diazo, azoxy, nitrone, carbon-carbon double bond, carbon-carbon triple bond, amide, imide, Schiff base, and ester; and R is selected from the group consisting of poly(alkylene oxide), polyalkane, polyperfluoroalkane, polysiloxane, and aliphatic polyether.

15. A method according to claim 14 wherein the mesogen-containing polymer film has at least one linking group selected from the group consisting of ether, ester, amide, imide, urethane, alkylene, alkyl.

16. A method according to claim 15 wherein the mesogen-containing polymer film has at least one spacer group selected from the group consisting of poly(alkylene oxide), polyalkane, polyperfluoroalkane, polysiloxane, and aliphatic polyether.

17. A method according to claim 14 wherein the mesogen-containing polymer film has at least one spacer group selected from the group consisting of poly(alkylene oxide), polyalkane, polyperfluoroalkane, polysiloxane, and aliphatic polyether.

18. A method according to claim 1 wherein the mesogen groups are selected from the group consisting of trans 1,3 cyclohexane; trans 1,4 cyclohexane; trans 2,5 disubstituted 1,3 dioxane; trans 2,5 disubstituted 1,3 dithiane; and trans 2,5 disubstituted 1,3 dioxathiane.

19. A method according to claim 18 wherein the mesogen-containing polymer film has at least one linking group selected from the group consisting of ether, ester, amide, imide, urethane, alkylene, alkyl.

20. A method according to claim 19 wherein the mesogen-containing polymer film has at least one spacer group selected from the group consisting of poly(alkylene oxide), polyalkane, polyperfluoroalkane, polysiloxane, and aliphatic polyether.

21. A method according to claim 18 wherein the mesogen-containing polymer film has at least one spacer group selected from the group consisting of poly(alkylene oxide), polyalkane, polyperfluoroalkane, polysiloxane, and aliphatic polyether.

22. A method according to claim 1 wherein the mesogen-containing polymer film has at least one linking group selected from the group consisting of ether, ester, amide, imide, urethane, alkylene, alkyl.

23. A method according to claim 22 wherein the mesogen-containing polymer film has at least one spacer group selected from the group consisting of poly(alkylene oxide), polyalkane, polyperfluoroalkane, polysiloxane, and aliphatic polyether.

24. A method according to claim 1 wherein the mesogen-containing polymer film has at least one spacer group selected from the group consisting of poly(alkylene oxide), polyalkane, polyperfluoroalkane, polysiloxane, and aliphatic polyether.

\* \* \* \* \*